United States Patent
Yamazaki et al.

(10) Patent No.: US 10,109,825 B2
(45) Date of Patent: Oct. 23, 2018

(54) PACKAGING MATERIAL FOR LITHIUM CELL

(71) Applicant: TOPPAN PRINTING CO., LTD., Tokyo (JP)

(72) Inventors: Tomohiko Yamazaki, Tokyo (JP); Masayoshi Suzuta, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 204 days.

(21) Appl. No.: 15/192,391

(22) Filed: Jun. 24, 2016

(65) Prior Publication Data

US 2016/0308175 A1   Oct. 20, 2016

Related U.S. Application Data

(63) Continuation of application No. PCT/JP2014/084589, filed on Dec. 26, 2014.

(30) Foreign Application Priority Data

Dec. 27, 2013   (JP) .................. 2013-270745
Dec. 27, 2013   (JP) .................. 2013-270746
(Continued)

(51) Int. Cl.
*H01M 2/02*   (2006.01)
*B32B 7/00*   (2006.01)
(Continued)

(52) U.S. Cl.
CPC ............ *H01M 2/0287* (2013.01); *B32B 7/00* (2013.01); *B32B 7/12* (2013.01); *B32B 15/00* (2013.01);
(Continued)

(58) Field of Classification Search
None
See application file for complete search history.

(56) References Cited

U.S. PATENT DOCUMENTS

| | | | |
|---|---|---|---|
| 3,966,870 A | * | 6/1976 | Vecchiotti ............... B29C 41/06 264/114 |
| 2010/0015451 A1 | | 1/2010 | Suzuta |
| 2013/0209868 A1 | * | 8/2013 | Suzuta ................ H01M 2/0275 429/176 |

FOREIGN PATENT DOCUMENTS

| EP | 2 112 703 | * 10/2009 |
|----|-----------|-----------|
| EP | 2 112 703 A1 | 10/2009 |

(Continued)

OTHER PUBLICATIONS

International Search Report issued in PCT/JP2014/084589 dated Apr. 7, 2015.
(Continued)

*Primary Examiner* — Alix E Eggerding
(74) *Attorney, Agent, or Firm* — Foley & Lardner LLP

(57) ABSTRACT

A packaging material for lithium cell of the present invention includes a laminate of a substrate layer, a first adhesive layer, a metal foil layer, an anti-corrosion treatment layer of a single-layer or plural-layer structure, a second adhesive layer and a sealant layer stacked in this order. The anti-corrosion treatment layer is provided on the side of the second adhesive layer and contains a rare earth element oxide, 1 to 100 parts by mass of phosphoric acid or a phosphate salt per 100 parts by mass of the rare earth element oxide, and at least one polymer selected from the group of a cationic polymer and an anionic polymer wherein the at least one polymer is contained at least in the layer contacting with the second adhesive layer and the second (Continued)

adhesive layer contains a compound reactive with the at least one polymer contained in the layer contacting with the second adhesive layer.

16 Claims, 3 Drawing Sheets

(30) Foreign Application Priority Data

Dec. 24, 2014 (JP) .................................. 2014-260884
Dec. 24, 2014 (JP) .................................. 2014-260885

(51) Int. Cl.
| | | |
|---|---|---|
| *B32B 7/12* | (2006.01) | |
| *B32B 15/00* | (2006.01) | |
| *B32B 15/04* | (2006.01) | |
| *B32B 15/08* | (2006.01) | |
| *B32B 27/00* | (2006.01) | |
| *B32B 27/06* | (2006.01) | |
| *B32B 27/08* | (2006.01) | |
| *B32B 27/18* | (2006.01) | |
| *H01M 2/08* | (2006.01) | |
| *H01M 10/0525* | (2010.01) | |
| *H01M 10/052* | (2010.01) | |

(52) U.S. Cl.
CPC .............. *B32B 15/04* (2013.01); *B32B 15/08* (2013.01); *B32B 27/00* (2013.01); *B32B 27/06* (2013.01); *B32B 27/08* (2013.01); *B32B 27/18* (2013.01); *H01M 2/0267* (2013.01); *H01M 2/0275* (2013.01); *H01M 2/0277* (2013.01); *H01M 2/08* (2013.01); *H01M 10/052* (2013.01); *H01M 10/0525* (2013.01); *B32B 2250/00* (2013.01); *B32B 2250/05* (2013.01); *B32B 2264/102* (2013.01); *B32B 2264/104* (2013.01); *B32B 2307/714* (2013.01); *B32B 2457/00* (2013.01); *B32B 2457/10* (2013.01); *H01M 2220/30* (2013.01)

(56) References Cited

FOREIGN PATENT DOCUMENTS

| | | |
|---|---|---|
| JP | 2008-210777 A | 9/2008 |
| JP | 2010-092703 A | 4/2010 |
| JP | 2011-187385 A | 9/2011 |
| JP | 2012-124068 A | 6/2012 |
| JP | 2013-025980 A | 2/2013 |

OTHER PUBLICATIONS

Extended European Search Report dated Jul. 26, 2017 in European Patent Application No. 14875232.2.

* cited by examiner

PACKAGING MATERIAL FOR LITHIUM CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of PCT International Application No. PCT/JP2014/084589 filed on Dec. 26, 2014, which is based upon and claims the benefit of priority of Japanese Patent Application No. 2013-270745, filed on Dec. 27, 2013, Japanese Patent Application No. 2013-270746, filed on Dec. 27, 2013, Japanese Patent Application No. 2014-260884, filed on Dec. 24, 2014, and Japanese Patent Application No. 2014-260885, filed on Dec. 24, 2014, the entire contents of them all are hereby incorporated by reference.

TECHNICAL FIELD

This invention relates to a packaging material for lithium cells.

BACKGROUND

For consumer secondary cells employed in mobile terminal devices such as personal computers, mobile phones and the like, and video cameras, there have been intensively developed lithium ion cells that are capable of being super-thinned and miniaturized although high in energy.

As a packaging material for lithium ion cells (which may be sometimes referred to simply as "packaging material"), multi-layered laminate films have been in use in place of existing metal cans because of their advantages of light-weight and freedom in selection of a cell shape. The packaging material using such a laminate film not only has the freedom in selection of a cell shape, but also is light in weight, high in heat radiation performance and low in cost. Therefore, attempts have been made to its application to batteries of hybrid vehicles and electric vehicles that have been pronouncedly developed recently and have a low environmental burden.

As to the structure of the laminate film, the usual practice is such that a sealant layer (thermally fusible film) is stacked on one surface of a metal foil layer, such as an aluminum foil, through an adhesive layer, and a substrate layer (plastic film) is stacked on the other surface through an adhesive layer (i.e. substrate layer/adhesive layer/metal foil layer/adhesive layer/sealant layer).

The lithium ion cells making use of a packaging material of the laminate film type can be formed, for example, in the following way: Initially, the laminate film is deep drawn by the use of cold forming (deep drawing) to obtain a formed article. Next, the formed article is accommodated therein with an electrolytic solution or an electrolyte layer composed of a polymer gel impregnated with the electrolytic solution along with a cell body that is made of a positive electrode material, a negative electrode material, and a separator. In the state where such members as mentioned above are accommodated in the formed article, the formed article is thermally sealed by heat sealing to form a cell.

The electrolytic solution used is one wherein a lithium salt is dissolved in an aprotic solvent (e.g. propylene carbonate, ethylene carbonate, dimethyl carbonate, diethyl carbonate, ethyl methyl carbonate or the like).

The electrolytic solution has high permeability in the sealant layer. Accordingly, it has been experienced that an electrolytic solution infiltrated in the sealant layer of lithium ion cells causes the lamination strength between the metal foil layer and the sealant layer to be lowered, finally resulting in the leakage of the electrolytic solution. The lithium salt, such as $LiPF_6$, $LiBF_4$ or the like, serving as an electrolyte may sometimes generate hydrofluoric acid by hydrolytic reaction. Hydrofluoric acid causes the corrosion of a metal surface and brings about the lowering of the lamination strength between the respective adjacent layers of the laminate film. In this sense, the packaging material should have an anti-corrosion performance against an electrolytic solution or hydrofluoric acid.

As a packaging material satisfying the above requirement, there has been disclosed, for example, in PTL 1 a packaging material that is able to suppress the lamination strength between a sealant layer and a metal foil layer from being lowered with time due to an electrolytic solution. In this packaging material, the sealant layer and the metal foil layer are bonded through a layer made of an adhesive containing a carboxy group-containing polyolefin resin and a polyfunctional isocyanate compound.

CITATION LIST

Patent Literature

PTL 1: JP-A-2010-92703

SUMMARY OF THE INVENTION

Technical Problem

However, the combination of a carboxy group-containing polyolefin resin and a polyfunctional isocyanate compound as described in PTL 1 is a system that is slow in reaction rate. Where the reaction rate is slow, a prolonged aging time is needed so as to ensure satisfactory adhesion between the sealant layer and the metal foil layer.

The adhesive layer mentioned in PTL 1 has a crosslinked structure so that this layer can be functioned, for example, as an insulating layer in steps of sealing between the adhesive layer and an electrode tab and also of degassing sealing during the fabrication of cells.

However, if a difficulty is involved in satisfactory bonding between the sealant layer and the metal foil layer, it has sometimes happened that where a packaging material is shaped in the form of a pocket by cold forming, the stress during the forming is concentrated at the interface between the sealant layer and the metal foil layer thereby causing fine lifting to occur. As a consequence, insulating properties have been lowered beginning at the fine lifting in some cases.

For the purpose of imparting a resistance to an electrolytic solution, an anti-corrosion treatment layer may be sometimes formed on the surface of the metal foil layer at the sealant layer side. In this case, the anti-corrosion treatment layer and the sealant layer are bonded together through the adhesive layer.

However, it has sometimes occurred that hydrofluoric acid or the like, which is formed by hydrolysis of a lithium salt serving as an electrolyte, is impregnated between the anti-corrosion treatment layer and the adhesive layer as described above, there lowering the lamination strength.

The present invention has been made under such circumstances as set out above and has for its object the provision of a packaging material for lithium cell, which is able to develop high lamination strength within a short aging time, is excellent in resistance to electrolytic solution and ensures insulating properties when subjected to cold forming.

Solution to Problem

A packaging material for lithium cell according to a first embodiment of the present invention includes a laminate wherein a substrate layer, a first adhesive layer, a metal foil layer, an anti-corrosion treatment layer having a single-layered or multilayered structure, a second adhesive layer, and a sealant layer stacked in this order, wherein the anti-corrosion treatment layer is formed at least on a side of the second adhesive layer and contains a rare earth element oxide, 1 to 100 parts by mass of phosphoric acid or a phosphate salt per 100 parts by mass of the rare earth element oxide, and at least one polymer selected from the group consisting of a cationic polymer and an anionic polymer, the at least one polymer being contained at least in a layer contacting with the second adhesive layer, the second adhesive layer containing a compound reactive with the at least one polymer contained in the layer contacting with the second adhesive layer.

A packaging material for lithium cell according to a second embodiment of the present invention include a laminate wherein a substrate layer, a first adhesive layer, a metal foil layer, an anti-corrosion treatment layer having a single-layered or multilayered structure, a second adhesive layer, and a sealant layer stacked in this order, wherein the anti-corrosion treatment layer is formed at least on a side of the second adhesive layer, at least one polymer selected from the group consisting of a cationic polymer and an anionic polymer being contained in the layer contacting with the second adhesive layer, the anti-corrosion treatment layer being formed on the metal foil layer after having been subjected to at least one treatment selected from the group consisting of defatting treatment, hot water conversion treatment, anodization treatment and chemical conversion treatment, the second adhesive layer containing a compound reactive with the at least one polymer contained in the layer contacting with the second adhesive layer.

In the packaging materials for lithium cell of the first and second embodiments of the invention, the anti-corrosion treatment layer can contain a cationic polymer in its layer portion contacting with the second adhesive layer, and the compound reactive with the cationic polymer contained in the second adhesive layer includes at least one member selected from the group consisting of a polyfunctional isocyanate compound, a glycidyl compound, a carboxy group-containing compound and an oxazoline group containing compound.

In the packaging materials for lithium cell of the first and second embodiments of the present invention, the cationic polymer can be at least one member selected from the group consisting of a polyethylene imine, an ionic polymer complex made of a polyethylene imine and a carboxylic acid-bearing polymer, a primary amine-grafted acrylic resin wherein a primary amine is grafted to an acrylic main skeleton, polyallylamine or its derivatives and an aminophenol polymer.

In the packaging materials for lithium cell of the first and second embodiments of the present invention, the anti-corrosion treatment layer can contain an anionic polymer in its layer portion contacting the second adhesive layer wherein the compound reactive with the anionic polymer can be at least one member selected from the group consisting of a glycidyl compound, an oxazoline group-containing compound and a carbodiimide compound.

In the packaging materials for lithium cell of the first and second embodiments of the present invention, the anionic polymer can be a carboxy group-containing polymer, which may be poly(meth)acrylic acid or its salt, or a copolymer obtained by copolymerizing a monomer mixture including (meth)acrylic acid or its salt.

In the packaging materials for lithium cell of the first and second embodiments of the present invention, the second adhesive layer may further contain an acid-modified polyolefin resin.

In the packaging material for lithium cell of the first embodiment of the present invention, the rare earth element oxide can be cerium oxide.

In the packaging materials for lithium cell of the first and second embodiments of the present invention, an anti-corrosion treatment layer having a single-layered or multilayered structure can be provided between the first adhesive layer and the metal foil layer.

Effect of Invention

The packaging materials for lithium cell according to the first and second embodiments of the present invention are able to develop high lamination strength within a short aging time, are much improved and even excellent in resistance to electrolytic solution, and ensure insulating properties when subjected to cold forming.

DESCRIPTION OF REPRESENTATIVE EMBODIMENTS

[First Embodiment]

Figure 1:
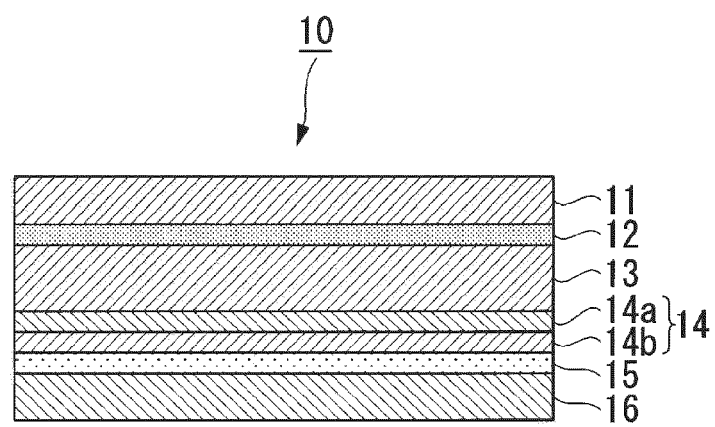
FIG. 1 is a sectional view showing a packaging material for lithium cell according to a first embodiment of the present invention.

As a packaging material for lithium cell according to a first embodiment of the present invention, a packaging material 10 for lithium cell (hereinafter referred to simply as "packaging material") shown in FIG. 1 is now described. It will be noted that in the respective drawings used for the following description, the dimensions of the respective members are appropriately changed so that they are recognizable in size.

As shown in FIG. 1, a packaging material 10 of the present embodiment is constituted of a laminate wherein a substrate layer 11, a first adhesive layer 12, a metal foil layer 13, an anti-corrosion treatment layer 14 having a two-layer structure, a second adhesive layer 15 and a sealant layer 16 laminated in this order.

The packaging material 10 is such that the substrate layer 11 is used as an outermost layer and the sealant layer 16 is used as an innermost layer.

[Substrate Layer]

The substrate layer 11 plays a role in imparting a heat resistance in a heat-sealing step during the fabrication of a lithium cell and suppressing the occurrence of pinholes that would appear during the forming process or distribution. Especially, with the case of a packaging material for large-sized lithium cells, a scratch resistance, a chemical resistance and insulating properties can also be imparted.

Resin films formed of insulating resins are preferably used as the substrate layer 11.

Such resins films include, for example, stretched or unstretched films such as of polyesters, polyamides, polypropylene and the like.

The substrate layer 11 may be in the form of either a single layer or a two- or multilayer. For example, the substrate layer may be a resin layer with a single-layer structure formed of any one of the above-indicated resin films, or may be a resin layer having a multilayer structure wherein two or more resin films indicated above are laminated. For these resin layers, mention is made, for example, of a stretched polyamide film or unstretched polyamide film, a stretched polyester film or unstretched polyester film, a two-layer film of a stretched polyamide film and a stretched polyester film. Additionally, a co-extruded biaxially stretched multilayer film, which is obtained, for example, by coextruding a polyester and a polyamide by use of an adhesive resin and then subjecting to biaxial stretching, may be used as the substrate layer 11.

It is preferred from the standpoint of improvement in formability and heat resistance to use a stretched polyamide film as the substrate layer 11. From the standpoint of improvement in acid resistance, a stretched polyester film is preferred for use as the substrate layer 11. In view of the ease in balancing formability, heat resistance and acid resistance, a laminated film of a stretched polyamide film and a stretched polyester film is preferred.

The thickness of the substrate layer 11 is preferably at not less than 6 μm and more preferably at not less than 10 μm in view of the formability, heat resistance, pinhole resistance and insulating properties. In this regard, however, the thickness of the substrate layer 11 is preferably not larger than 60 μm and more preferably at not larger than 45 μm in view of film thinning and high heat dissipation properties.

If the substrate layer 11 is made of a multilayer resin film, its thickness means a total thickness.

The outermost surface of the substrate layer 11 (i.e. a surface opposite to the side of the first adhesive layer 12) may be coated with a variety of additives such as an acid resistance imparting agent, a flame retardant, a slipping agent, an antiblocking agent, an antioxidant, a light stabilizer, a tackifier and the like.

The acid resistance imparting agent includes, for example, polyvinylidene chloride, a vinylidene chloride-vinyl chloride copolymer, maleic anhydride-modified polypropylene, a polyester resin, an epoxy resin, a phenol resin, a fluorine resin, a cellulose ester, a urethane resin, an acrylic resin or the like.

The slipping agent includes, for example, a fatty acid amide such as an oleic amide, an erucic amide, a stearic amide, a behenic acid, an ethylene bisoleic acid, an ethylene biserucic amide or the like.

The antiblocking agent preferably includes ones based on a variety of fillers such as silica.

These additives may be used singly or in combination of two or more.

[First Adhesive Layer]

The first adhesive layer 12 is one bonding the substrate layer 11 and the metal foil layer 13 therethrough.

The first adhesive layer 12 can be formed by use of known adhesives ordinarily employed for the lamination of a resin film and a metal foil. The adhesives include polyurethane adhesives which include, for example, a main agent made of a polyol such as a polyester polyol, a polyether polyol, an acrylic polyol, a carbonate polyol or the like, and a curing agent made of a bi- or more functional isocyanate. The curing agent is acted on the main agent to form a polyurethane resin.

Usable polyester polyols include compounds obtained by reaction between at least one polybasic acid and at least one diol.

Examples of the polybasic acid include dibasic acids, which include aliphatic dibasic acids such as succinic acid, glutaric acid, adipic acid, pimelic acid, suberic acid, azelaic acid, sebacic acid, brassylic acid and the like, and aromatic dibasic acids such as isophthalic acid, terephthalic acid, naphthalene dicarboxylic acids and the like.

The diols include, for example, aliphatic diols such as ethylene glycol, propylene glycol, butanediol, neopentyl glycol, methyl pentanediol, hexanediol, heptanediol, octanediol, nonanediol, decanediol, dodecanediol and the like, alicyclic diols such as cyclohexanediol, hydrogenated xylylene glycol and the like, and aromatic diols such as xylylene glycol and the like.

The polyester polyols include polyester urethane polyols obtained by subjecting both terminal hydroxyl groups of the above-indicated polyester polyols to chain elongation with an isocyanate compound itself, or an adduct, biuret or isocyanurate of at least one isocyanate compound.

The isocyanate compounds include, for example, diisocyanates such as 2,4- or 2,6-tolylene diisocyanate (TDI) or its hydrogenated product, crude TDI, xylylene diisocyanate (XDI) or its hydrogenated product, hexamethylene diisocyanate (HDI), 4,4'-diphenylmethane diisocyanate (MDI) or a hydrogenated product thereof, crude MDI, methylene diisocyanate, isopropylene diisocyanate, lysine diisocyanate, 2,2, 4- or 2,4,4-trimethylhexamethylene diisocyanate, 1,6-hexamethylene diisocyanate, methylcyclohexane diisocyanate, isophorone diisocyanate (IPDI), 4,4'-dicyclohexylmethane diisocyanate, isopropylidene dicyclohexyl-4,4'-diisocyanate and the like.

These isocyanate compounds may be used singly or in combination of two or more.

Usable polyether polyols include ether polyols such as polyethylene glycol, polypropylene glycol and the like, and polyether urethane polyols obtained by being acted with such isocyanate compounds as indicated above for chain elongation.

The acrylic polyols include copolymers composed mainly of poly(meth)acrylic acid. The copolymers include ones obtained by copolymerization of monomers including, aside from hydroxyl group-containing monomers such as 2-hydroxyethyl (meth)acrylate, 2-hydroxypropyl (meth)acrylate and the like, alkyl (meth)acrylate monomers wherein the alkyl group is a methyl group, an ethyl group an n-propyl group, an i-propyl group, an n-butyl group, an i-butyl group, a t-butyl group, an n-propyl group, an i-propyl group, an n-butyl group, an i-butyl group, a t-butyl group, a 2-ethylhexyl group or a cyclohexyl group, and further amide group-containing monomers including (meth)acrylamide, an N-alkyl (meth)acrylamide and an N,N-dialkyl meth)acrylamide (wherein the alkyl group is a methyl group, an ethyl group, an n-propyl group, an i-propyl group, an n-butyl group, an i-butyl group, a t-butyl group, a 2-ethylhexyl group, a cyclohexyl group or the like), an N-alkoxy (meth) acrylamide, an N,N-dialkoxy (meth)acrylamide (wherein the alkoxy group is a methoxy group, an ethoxy group, a butoxy group, an isobutoxy group or the like), and N-methylol(meth)acrylamide, an N-phenyl(meth)acrylamide or the like, glycidyl group-containing monomers such as glycidyl (meth)acrylate, allyl glycidyl ether and the like, silane-containing monomers such as (meth)acryloxypropyl trimethoxysilane and the like, and isocyanate group-containing monomers such as (meth)acryloxypropyl isocyanate and the like.

Usable carbonate polyols include those compounds obtained by reaction of carbonate compounds and diols.

The carbonate compounds include, for example, dimethyl carbonate, diphenyl carbonate, ethylene carbonate and the like.

The diols are such diols as exemplified above in the illustration of the polyester polyol.

Alternatively, polycarbonate urethane polyols wherein the terminal hydroxyl groups of the carbonate polyols have been subjected to chain elongation with such isocyanate compounds as indicated above may also be used.

These various polyols may be used singly or in blend of two or more depending on the function and performance required.

The bi- or more functional isocyanate compounds used as a curing agent include isocyanate compounds as previously exemplified in the illustration of the polyester polyols.

The amount of the curing agent is preferably at 1 to 100 parts by mass, more preferably at 5 to 50 parts by mass, per 100 parts by mass of the main agent. If less than 1 part by mass, there is some concern that its performance cannot be developed in regard of adhesion and a resistance to electrolytic solution. On the contrary, if larger than 100 parts by mass, the presence of excess isocyanate groups may cause some concern as to the influences on the quality of an adhesive film due to the residual unreacted matter and also on the hardness.

For the adhesion promotion, the polyurethane adhesive may be further formulated with a carbodiimide compound, an oxazoline compound, an epoxy compound, a phosphorous compound, a silane coupling agent and the like.

Examples of the carbodiimide include N,N'-di-o-toluyl carbodiimide, N,N'-diphenyl carbodiimide, N,N'-di-2,6-dimethylphenyl carbodiimide, N,N'-bis(2,6-diisopropylphenyl)carbodiimide, N,N'-dioctyldecyl carbodiimide, N-triyl-N'-cyclohexyl carbodiimide, N,N'-di-2,2-di-t-butylphenyl carbodiimide, N,N'-di-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-dicyclohexyl carbodiimide, N,N'-di-toluyl carbodiimide and the like. The carbodiimide compounds include compounds having units represented by the following general formula (1), compounds having units represented by the following general formula (2) and compounds having units represented by the following general formula (3):

[Chem. 1]

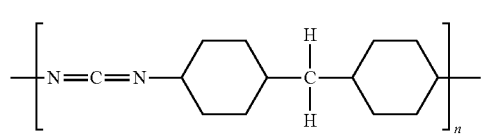
(1)

[Chem. 2]

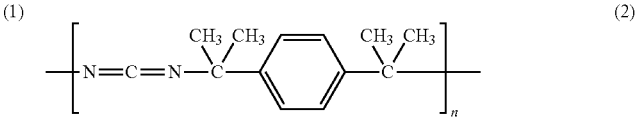
(2)

[Chem. 3]

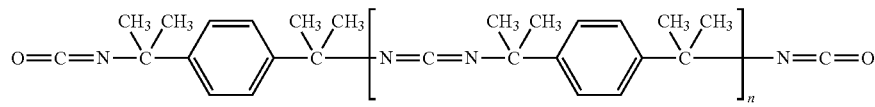
(3)

In the general formulas (1) to (3), n's are, respectively, an integer of 2 to 30, preferably an integer of 3 to 20.

Examples of the oxazoline compounds include monooxazoline compounds such as 2-oxazoline, 2-methyl-2-oxazoline, 2-phenyl-2-oxazoline, 2,5-dimethyl-2-oxazoline, 2,4-diphenyl-2-oxazoline and the like, and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline), 2,2'-(1,4-phenylene)-bis(2-oxazoline) and the like.

Examples of the epoxy compound include diglycidyl ethers of aliphatic diols such as 1,6-hexanediol, neopentyl glycol, polyalkylene glycol and the like, polyglycidyl ethers of aliphatic polyols such as sorbitol, sorbitan, polyglycerol, pentaerythritol, diglycerol, glycerol, trimethylolpropane and the like, polyglycidyl ethers of alicyclic polyols such as cyclohexane dimethanol and the like, diglycidyl esters or polyglycidyl esters of aliphatic and aromatic polyvalent carboxylic acids such as terephthalic acid, isophthalic acid, naphthalene dicarboxylic acid, trimellitic acid, adipic acid, sebacic acid and the like, diglycidyl ethers or polyglycidyl ethers of polyhydric phenols such as resorcinol, bis-(hydroxyphenol)methane, 2,2-bis-(p-hydroxyphenyl)propane, tris-(p-hydroxyphenyl)methane, 1,1,2,2-tetrakis(p-hydroxyphenyl)ethane and the like, N-glycidyl derivatives of amines such as N,N'-diglycidylaniline, N,N-diglycidyltoluidine, N,N,N,N-tetraglycidyl-bis-(p-aminophenol)methane and the like, triglycidyl derivatives of aminophenols, triglycidyl-tris(2-hydroxyethyl)isocyanurate, triglycidyl isocyanurate, ortho cresol epoxy resins, phenol novolac epoxy resins, and the like.

Examples of the phosphorus compound include tris(2,4-di-t-butylphenol)phosphite, tetrakis(2,4-di-t-butylphenyl) phosphite, 4,4'-biphenylene phosphite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecyl phosphite-5-t-butylphenyl)butane, tris(mixed mono- and di-nonylphenyl) phosphite, tris(nonylphenyl)phosphite, 4,4'-isopropylidene bis(phenyl-dialkyl phosphite) and the like.

Examples of the silane coupling agent include various types of silane coupling agents such as vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane and the like.

Besides, a variety of additives and stabilizers may be formulated in the adhesive although depending on the performance required for the adhesive.

The thickness of the first adhesive layer 12 is preferably at 1 to 10 μm, more preferably at 3 to 7 μm. If not less than 1 μm, laminate strength as an adhesive can be improved. If not larger than 10 μm, the lifting between the substrate layer 11 and the metal foil layer 13 can be well suppressed in an atmosphere of an electrolytic solution at the drawn corners of a deep-drawn product when the packaging material 10 is subjected to cold forming to provide a deep-drawn product.

[Metal Foil Layer]

The metal foil layer 13 has water vapor barrier properties capable of preventing moisture from entering the cell inside. The metal foil layer 13 has ductility enough for deep drawing.

For the metal foil layer 13, there can be used various types of metal foils such as of aluminum, stainless steels and the like. In view of weight (specific gravity), moisture proofing, formability and costs, aluminum foil is preferred. The metal foil layer composed of an aluminum foil may be called "aluminum foil layer".

As an aluminum foil serving as the metal foil layer 13, there may be used known soft aluminum foils. From the standpoint of a pinhole resistance and ductility during forming, an iron-containing aluminum foil is preferred. The content of iron in the aluminum foil (100 mass %) is preferably at 0.1 to 9.0 mass %, more preferably at 0.5 to 2.0 mass %, per 100 mass % of the total amount of the aluminum foil. If the content of iron is not less than the lower limit (0.1 mass %), the pinhole resistance and ductility are improved. If the content of iron is not larger than the upper limit (9.0 mass %), flexibility is improved.

The thickness of the aluminum foil layer is preferably at 9 to 200 μm, more preferably at 15 to 100 μm, in view of barrier properties, the pinhole resistance and processability.

Although an untreated aluminum foil may be used as the metal foil layer 13, it is preferred to use an aluminum foil that has been subjected to defatting treatment. The defatting treatment can be broadly classified into wet and dry types.

The wet-type defatting treatment includes acid defatting and alkali defatting. The acid used for the acid defatting includes, for example, an inorganic acid such as sulfuric acid, nitric acid, hydrochloric acid, hydrofluoric acid or the like. These acids may be used singly or in combination of two or more. From the standpoint of improving an etching effect of the aluminum foil, various types of metal salts acting as a supply source of iron (iii) ions or cerium (III) ions may be formulated, if necessary. The alkali used for the alkali defatting includes, for example, an alkali of a type wherein strong etching is enabled, such as sodium hydroxide. In addition, an alkali formulated with a weakly alkaline compound or a surfactant may also be used. The wet-type defatting treatment is carried out according to an immersion method or spraying method.

The dry-type defatting treatment includes, for example a method wherein defatting treatment is carried out in the step of annealing aluminum. Aside from the defatting treatment, flame treatment or corona treatment is mentioned. A further defatting treatment may also be adopted wherein a pollutant is decomposed and removed by oxidation with active oxygen generated by irradiation of UV light having a specific wavelength.

The aluminum foil may be subjected to defatting treatment to one surface or opposite surfaces thereof.

[Anti-corrosion Treatment Layer]

The anti-corrosion treatment layer 14 is one that is provided so as to prevent the metal foil layer 13 from being corroded with an electrolytic solution or hydrofluoric acid.

The anti-corrosion treatment layer 14 is a layer containing a rare earth element oxide, 1 to 100 parts by mass of phosphoric acid or a phosphate salt per 100 parts by mass of the rare earth element oxide, and at least one polymer selected from a cationic polymer and an anionic polymer.

It will be noted that where a coating layer, such as the anti-corrosion treatment layer 14, is formed on the metal foil layer 13, there may be sometimes used a technique wherein a silane coupling agent is usually used so as to improve adhesion at the interface between the metal foil layer 13 and the anti-corrosion treatment layer 14. In the first embodiment of the present invention, the anti-corrosion treatment layer 14 may or may not contain a silane coupling agent. In this regard, however, there might be some concern that although depending on the type of functional group contained in the silane coupling agent used, there occurs a side reaction between the component contained in the anti-corrosion treatment layer as described hereinafter and the silane coupling agent, thus impeding an originally intended reaction. Therefore, if there is concern that the reaction is impeded, it is preferred that the anti-corrosion treatment layer 14 does not contain any silane coupling agent.

As shown in FIG. 1, the anti-corrosion treatment layer 14 of the present embodiment has a two-layer structure including a first anti-corrosion treatment layer 14a and a second anti-corrosion treatment layer 14b.

The first anti-corrosion treatment layer 14a is a layer in contact with the metal foil layer 13 and contains a rare earth element oxide and phosphoric acid or a phosphate salt. The second anti-corrosion treatment layer 14b is a layer in contact with the second adhesive layer 15 described hereinafter and contains at least one polymer selected from the group consisting of a cationic polymer and an anionic polymer.

The second anti-corrosion treatment layer 14b should preferably contain a cationic polymer or an anionic polymer.

The rare earth element oxide includes, for example, cesium oxide, yttrium oxide, neodymium oxide, lanthanum oxide or the like. Of these, cerium oxide is preferred in view of a resistance to electrolytic solution.

For the formation of the first anti-corrosion treatment layer 14a, phosphoric acid or a phosphate salt is used as a dispersion stabilizing agent and can be used in the form of a sol (i.e. rare earth element sol) wherein the rare earth element oxide is dispersed and stabilized. The rare earth element sol is such that the fine particles (e.g. those particles whose average particle size is 100 nm or below) of a rare earth element oxide are dispersed in a liquid dispersion medium.

The liquid dispersion mediums of the rare-earth element sol include, for example, a variety of solvents such as an aqueous solvent, an alcohol solvent, a hydrocarbon solvent, a ketone solvent, an ester solvent, an ether solvent and the like, of which an aqueous solvent is preferred.

The use of phosphoric acid or a phosphate salt can be expected not only to stably disperse the rare earth element oxide, but also to improve adhesion with a metal foil layer (especially, an aluminum foil layer) by utilizing the capability of the aluminum chelating with phosphoric acid, to impart an electrolytic solution resistance by capturing aluminum ions dissolved out by the influence of hydrofluoric acid (i.e. the formation of passive state) and to improve the cohesion force of the first anti-corrosion treatment layer 14a due to the likelihood of causing the dehydration condensation of phosphoric acid to occur at low temperatures. The improved cohesion force tends to ensure good strength properties of the packaging material 10.

The phosphoric acid compounds such as phosphoric acid or a phosphate salts include, for example, orthophosphoric acid, pyrophosphoric acid, metaphosphoric acid, or alkali metal salts and ammonium salts thereof. Besides, various salts such as aluminum phosphate, titanium phosphate and the like may also be used. In terms of functional development, condensed phosphoric acids such as trimetaphosphoric acid, tetrametaphosphoric acid, hexametaphosphoric acid, ultra metaphosphoric acid and the like, or alkali metal salts and ammonium salts (condensed phosphate salts) are preferred.

Especially, in the case where a rare earth element oxide in the state of a sol (i.e. rare earth element oxide sol) is used to form the first anti-corrosion treatment layer 14a, it is preferred in view of dry film formability (i.e. drying capability and heat quantity) to use a dispersion stabilizing agent that is excellent in reactivity at low temperature. In this sense, a sodium salt that is excellent in dehydration condensability at low temperature is preferred as a phosphate salt. Preferred phosphoric acid compounds are water-soluble salts.

The content of phosphoric acid or its salt is 1 to 100 parts by mass, preferably 5 to 50 parts by mass and more preferably 5 to 20 parts by mass, per 100 parts by mass of the rare earth element oxide. If the content of phosphoric acid or its salt is not less than the lower limit (1 part by mass), the stability of the rare earth element oxide sol is improved thereby providing a packaging material 10 having a satisfactory function. On the other hand, if the content of phosphoric acid or its salt is not larger than the upper limit (100 parts by mass), the function of the rare earth element oxide so is enhanced, so that there can be formed the first anti-corrosion treatment layer 14a that has excellent capability of preventing erosion with an electrolytic solution.

The thickness of the first anti-corrosion treatment layer 14a is not critical and is preferably 0.01 to 10 µm.

It will be noted that a weight a per unit area of the first anti-corrosion treatment layer 14a is preferably at 0.010 to 0.200 g/m², more preferably at 0.040 to 0.100 g/m². If the weight a is smaller than the above lower limit (0.010 g/m²), the absolute amounts of the rare earth element oxide having an anti-corrosive effect on a metal foil, such as an aluminum foil, and phosphoric acid or a phosphate salt become so small that resistances to electrolytic solution and hydrofluoric acid are less likely to be obtained. On the other hand, if the weight a exceeds the upper value (0.200 g/m²), the sol-gel reaction resulting from the drying of the rare earth element oxide sol hardly proceeds (i.e. the sol-gel reaction hardly proceeds due to shortage in heat quantity), and thus the cohesion force of the rare earth element oxide sol lowers, with concern that strength properties are lowered when a packaging material is formed. Accordingly, if the weight a per unit area of the first anti-corrosion treatment layer 14a is within the range defined above, the resistance to electrolytic solution is kept and the cohesion force of the rare earth element oxide sol can be held, so that the strength required for a packaging material can be well imparted.

The cationic polymer is a compound excellent in resistances to electrolytic solution and hydrofluoric acid. The reason for this is assumed due to the suppression of the damage of an aluminum foil by trapping fluorine ions with the cationic group (anion catcher).

As a cationic polymer, mention is made of amine-containing polymers, and specific examples include polyethylene imine, ionic copolymer complexes made of polyethylene imine and carboxylic acid-containing polymers, primary amine-grafted acrylic resins wherein a primary amine is graft polymerized to an acrylic main skeleton, a polyallylamine or its derivatives, aminophenol polymer, and the like. These cationic polymers may be used singly or in combination of two or more. Of these, polyallylamine or its derivatives are preferred.

The carboxylic acid-containing polymer, which forms an ionic polymer complex along with polyethylene imine, includes a polycarboxylic acid (salt) such as polyacrylic acid or its ionic salt, its copolymers introduced with comonomers, or a carboxyl group-containing polysaccharide such as carboxymethyl cellulose or its ionic salt.

As a polyallylamine, there may be used homopolymers or copolymers of allylamine, allylamine amide sulfate, diallylamine, dimethylallylamine and the like. These amines may be either a free amine, or an amine stabilized with acetic acid or hydrochloric acid. As a comonomer component, there can be used maleic acid, sulfur dioxide and the like. Alternatively, a polyallylamine of the type wherein a primary amine is partially methoxidized to impart heat crosslinkability thereto may also be used. It should be noted that in the case of an aminophenol, it is also possible to use an aminophenol of the type, to which thermal crosslinkability is imparted by partial methoxylation of a primary amine.

The cationic polymer should preferably form a crosslinked structure in the second anti-corrosion treatment layer 14b. If the cationic polymer forms a crosslinked structure, the water resistance of the packaging material 10 is improved.

In order to provide a cationic polymer having a crosslinked structure, a crosslinking agent is used along with the cationic polymer when forming the second anti-corrosion treatment layer 14b. The crosslinking agent for forming the cationic polymer having a crosslinked structure includes, for example, at least one compound selected from the group consisting of a polyfunctional isocyanate compound, a glycidyl compound, a carboxy group-containing compound, an oxazoline group-containing compound, and a carbodiimide group-containing compound.

Examples of the polyfunctional isocyanate compound include: the diisocyanates indicated in the illustration of the first adhesive layer 12; adducts obtained by reacting these diisocyanates with polyhydric alcohols such as trimethylolpropane, biurets obtained by reaction of diisocyanates with water, and polyisocyanates such as isocyanurates which are a trimer; and blocked polyisocyanates obtained by blocking these polyisocyanates with alcohols, lactams, oximes and the like.

Examples of the glycidyl compound include epoxy compounds obtained by reacting epichlorohydrin with glycols, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, neopentyl glycol and the like; epoxy compounds obtained by reacting epichlorohydrin with polyhydric alcohols such as glycerine, polyglycerine, trimethylolpropane, pentaerythritol, sorbitol and the like, and epoxy compounds obtained by reacting epichlorohydrin with dicarboxylic acids such as phthalic acid, terephthalic acid oxalic acid, adipic acid and the like.

Examples of the carboxy group-containing compound include a variety of aliphatic or aromatic dicarboxylic acids. Additionally, poly(meth)acrylic acid or alkaline (earth) metals salts of poly(meth)acrylic acid may also be used.

Usable oxazoline group-containing compounds include low-molecular-weight compounds having two or more oxazoline units. Where a polymerizable monomer such as isopropenyl oxazoline is used, those obtained by copolymerizing with acrylic monomers such as (meth)acrylic acid, (meth)acrylic alkyl ester, (meth)acrylic hydroxyalkyl ester and the like may also be used.

The carbodiimide group-containing compounds include such carbodiimide compounds as indicated before in the illustration of the first adhesive layer.

It is appropriate that these crosslinking agents are formulated at 1 to 50 parts by mass per 100 parts by mass of the cationic polymer. If the amount of the crosslinking agent is less than the lower limit (1 part by mass), an unsatisfactory crosslinked structure results. On the other hand, if the amount exceeds the upper limit (50 parts by mass), there is some concern that the pot life of a coating solution lowers.

It is to be noted that in the case where the cationic polymer is made of a polyallylamine derivative wherein the primary amine of polyallylamine is methoxycarbonized, the resulting derivative has heat crosslinkability, so that if no crosslinking agent is formulated in the cationic polymer, such a cationic polymer can be regarded as being substantially equal to a cationic polymer formulated with a crosslinking agent.

The crosslinking agents may be used singly or in combination with two or more.

Further, a silane coupling agent wherein an amine and a functional group are selectively reacted so as to enable the siloxane bond to be acted as a crosslinking point may be or may not be used in combination with the crosslinking agent. In this regard, however, in the case where the component contained in the anti-corrosion treatment layer and a silane coupling agent undergo a side reaction as stated above with concern that an originally intended reaction is impeded, it is preferred that the anti-corrosion treatment layer 14 does not contain any silane coupling agent.

Examples of the silane coupling agent include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropylmethoxysilane, and γ-isocyanatopropyltriethoxysialne. Especially, β-(3,4-epoxycyclohexyl)ethyltrimethoxysilane, γ-aminopropyltriethoxysilane and γ-isocyanatopropyltriethoxysilane are preferred in view of the reactivity with a cationic polymer or its copolymer.

The anionic polymer is one that improves the stability of the second anti-corrosion treatment layer 14b.

In general, when an ionic contaminant, particularly, an alkali metal ion such as a sodium ion or an alkaline earth metal ion, is contained in a protective layer that is provided not only for use as a packaging material, but also for preventing the corrosion of an aluminum foil, for example, with a corrosive compound, the protective layer may be attacked by the ionic contaminant serving as an origin in some cases.

When the second anti-corrosion treatment layer 14b contains an anionic polymer, the ionic contaminant, such as a sodium ion, present in such a rare-earth element oxide sol as stated before can be fixed, thereby enabling the durability of a packaging material to be improved.

The anionic polymer is a material that has characteristics directly opposite to those of the cationic polymer. Specifically, mention is made of carboxy group-containing polymers. Such polymers include poly(meth)acrylic acid or its salt, or copolymers obtained by copolymerizing monomer mixtures including (meth)acrylic acid or its salt.

The components other than (meth)acrylic acid or its salt and contained in the monomer mixture include: an alkyl (meth)acrylate monomer having an alkyl group such as a methyl group, an ethyl group, an n-propyl group, an i-propyl group, an n-butyl group, an i-butyl group, a t-butyl group, a 2-ethylhexyl group, a cyclohexyl group or the like; an amide group-containing monomer such as (meth)acrylamide, an N-alkyl(meth)acrylamide or an N,N-dialkyl(meth)acrylamide (wherein the alkyl group is a methyl group, an ethyl group, an n-propyl group, an i-propyl group, an n-butyl group, an i-butyl group, a t-butyl group, a 2-ethylhexyl group, a cyclohexyl group or the like), an N-alkoxy(meth)acrylamide or an N,N-dialkoxy(meth)acrylamide (wherein the alkoxy group is a methoxy group, an ethoxy group, a butoxy group, an isobutoxy group or the like), or N-methylol (meth)acrylamide, N-phenyl(meth)acrylamide or the like; a hydroxyl group-containing monomer such as 2-hydroxyethyl (meth)acrylate, 2-hydroxyethyl (meth)acrylate, 2-hydroxypropyl (meth)acrylate or the like; a glycidyl group-containing monomer such as glycidyl (meth)acrylate, allyl glycidyl ether or the like; a silane-containing monomer such as (meth)acryloxypropyltrimethoxysilane or the like; or an isocyanate group-containing monomer such as (meth)acryloxypropylisocyanate or the like.

Preferably, the anionic polymer should also form a crosslinked structure in the second anti-corrosion treatment layer 14b. If the anionic polymer has a crosslinked structure formed therein, the water resistance of the packaging material 10 is improved.

In order to form a crosslinked structure in the anionic polymer, a crosslinking agent is used along with an anionic polymer when the second anti-corrosion treatment layer 14b is formed. The crosslinking agent used to form an anionic polymer having a crosslinked structure is one indicated before in the illustration of the cationic polymer. Aside from the above-indicated crosslinking agents, titanium compounds or zirconium compounds may be used as a crosslinking agent so as to form a crosslinked structure such as of ionic crosslinkage.

It is appropriate that the crosslinking agent is formulated at 1 to 50 parts by mass per 100 parts by mass of anionic polymer. If the amount of the crosslinking agent is less than the lower limit (1 part by mass), an unsatisfactory crosslinked structure results. On the other hand, when the amount exceeds the upper limit (50 parts by mass), there is some concern that the pot life of a coating solution lowers.

The crosslinking agents may be used singly or in combination or two or more. A crosslinking agent and a silane coupling agent may be or may not be used in combination. As stated before, however, in the case where the component contained in the anti-corrosion treatment layer and a silane coupling agent undergo a side reaction with concern that an originally intended reaction is impeded, the anti-corrosion treatment layer 14 should not preferably contain any silane coupling agent. Where a crosslinking agent and a silane coupling agent are used in combination, those silane coupling agents indicated before in the illustration of the cationic polymer can be used as a silane coupling agent.

As shown in FIG. 1, the first anti-corrosion treatment layer 14a is laminated directly on the metal foil layer 13. The first anti-corrosion treatment layer 14a substantially has such a structure that sol particles of a rare earth element oxide are closely packed. On the other hand, the second anti-corrosion treatment layer 14b is stacked on the first anti-corrosion treatment layer 14b while filling the gaps of the first anti-corrosion treatment layer 14a wherein the sol particles are tightly packed. More particularly, a material (which may be hereinafter referred to also as "coating composition (b)") containing at least one polymer selected from the group consisting of a cationic polymer and an anionic polymer for the second anti-corrosion treatment layer 14b is coated onto the first anti-corrosion treatment layer 14a while infiltrating the gaps of the first anti-corrosion treatment layer 14a thereby forming the second anti-corrosion treatment layer 14b. On this occasion, when the coating composition (b) infiltrated into the gaps of the first anti-corrosion treatment layer 14a is thermally crosslinked, the second anti-corrosion treatment layer 14b brings about the effect of functioning as a protective layer protecting the first anti-corrosion treatment layer 14a.

In order that the second anti-corrosion treatment layer 14b more effectively brings about the effect of functioning as a protective layer protecting the first anti-corrosion treatment layer 14a, it is preferred that the relation between weight a (g/m$^2$) per unit area of the first anti-corrosion treatment layer 14a and weight b (g/m$^2$) per unit area of the second anti-corrosion layer 14b satisfies 2≥b/a.

If the relation in weight between the respective layers (b/a) exceeds the above range, it may be possible that the second anti-corrosion treatment layer 14b acts to function as a protective layer protecting the first anti-corrosion treatment layer 14a. In this case, in addition to the ratio of filling the gaps of the first anti-corrosion treatment layer 14a, the ratio of the second anti-corrosion treatment layer 14b stacked on the first anti-corrosion treatment layer 14a increases more than necessary. The cationic polymer and/or anionic polymer (i.e. at least one of the cationic polymer and the anionic polymer) in the second anti-corrosion treatment layer 14b may be present singly, or may be complexed, in the second anti-corrosion treatment layer 14b, with a rare earth element oxide and phosphoric acid or a phosphate salt in the first anti-corrosion treatment layer 14a. When compared with the case of the single presence, the complexed one tends to more effectively bring about the function of resistances to electrolytic solution and hydrofluoric acid. Accordingly, when the weight relation (b/a) of the respective layers exceeds the above range, the eventual ratio of the cationic polymer and/or anionic polymer, which is present singly without complexing with the rare earth element oxide and phosphoric acid or a phosphate salt in the first anti-corrosion treatment layer 14a, increases. Therefore, the function of resistances to electrolytic solution, hydrofluoric acid and water may not be well shown in some cases, with concern that the resistances to electrolytic solution and hydrofluoric acid lower. Because the coating amount of the coating composition (b) increases, it may be less likely to be cured. In order to fully cure the coating composition (b), it is enough that a drying temperature is set high, or a curing time is set long. As a consequence, there may be concern that productivity lowers. Accordingly, from the standpoint of improving the resistances to electrolytic solution and hydrofluoric acid while keeping productivity, the weight relation (b/a) between the respective layers is preferably such that 2≥b/a, more preferably such that 1.5≥b/a≥0.01 and most preferably such that 1.0≥b/a≥0.1.

It will be noted that although the above relation is expressed based on the weight of the layer, this relation can be converted to a total thickness of the anti-corrosion treatment layer 14 if the specific gravities of the respective layers can be determined.

Figure 2:
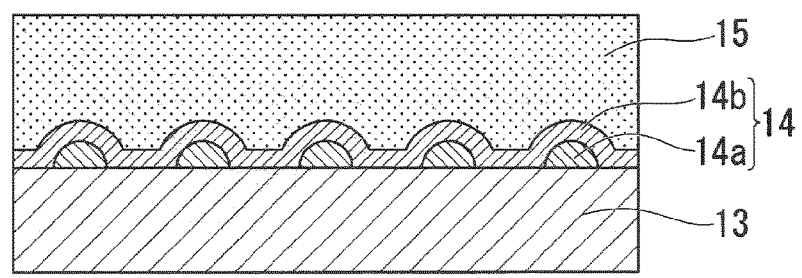
FIG. 2 is a partial sectional view showing an enlarged example of a metal foil layer, an anti-corrosion treatment layer, and a second adhesive layer of the packaging material for lithium cell shown in FIG. 1.
Figure 3:
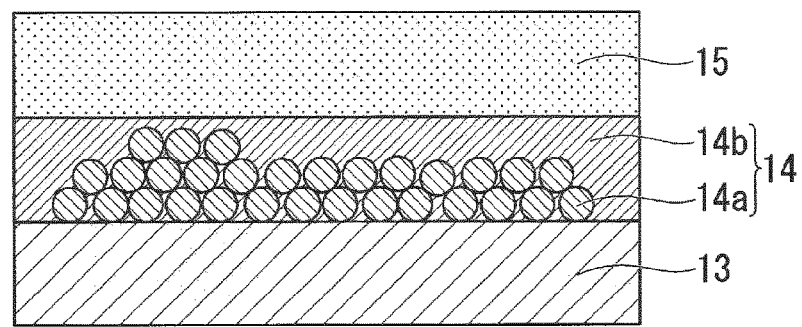
FIG. 3 is a partial sectional view showing another enlarged example of a metal foil layer, an anti-corrosion treatment layer, and a second adhesive layer of the packaging material for lithium cell shown in FIG. 1.

With reference to FIGS. 2, 3, an example of a specific structure of the first anti-corrosion treatment layer 14a and the second anti-corrosion treatment layer 14b of the anti-corrosion treatment layer 14 is illustrated.

Although the details are described hereinafter, in the fabrication step (in step (1) described later) of forming the anti-corrosion treatment layer 14 on the metal foil layer 13, the first anti-corrosion treatment layer 14a and the second anti-corrosion treatment layer 14b are formed through two steps. The structures of the first anti-corrosion treatment layer 14a and the second anti-corrosion treatment layer 14b may be changed by changing film-forming conditions in the fabrication step. As shown in FIGS. 2, 3, even with the case where the structures of the anti-corrosion treatment layer 14 including the first anti-corrosion treatment layer 14a and the second anti-corrosion treatment layer 14b differ from each other, such structures are referred to as "anti-corrosion treatment layer 14 having a two-layer structure" in the first embodiment of the present invention. In other words, the anti-corrosion treatment layer 14 may be called a mixed layer wherein the first anti-corrosion treatment layer 14a and the second anti-corrosion treatment layer 14b are mixed.

In the structure of the anti-corrosion treatment layer 14 shown in FIG. 2, the first anti-corrosion treatment layer 14a constituted of fine particles is formed on the metal foil layer 13. The second anti-corrosion treatment layer 14b having a relatively small thickness is formed (overcoated) to cover the first anti-corrosion treatment layer 14a. Moreover, a second adhesive layer 15 is formed to cover the second anti-corrosion treatment layer 14b.

The first anti-corrosion treatment layer 14a has such a structure that a plurality of fine particles are discretely (scatteredly) disposed on the metal foil layer 13 (i.e. discontinuous structure). Hence, spaces between adjacent fine particles are formed. The second anti-corrosion treatment layer 14b covers the fine particulate, first anti-corrosion treatment layer 14a so as to fill the gaps therewith and partially contacts with the metal foil layer 13. The surface profile of the fine particles and the surface profile of the gaps (the exposed portions of the metal foil layer 13) formed among the fine particles permit an irregular surface (protruded surfaces) to be formed on the metal foil layer 13 by means of the particles. The surface roughness of the irregular surface is, for example at a nanometer level. The second anti-corrosion treatment layer 14b is formed along the irregular surface of the first anti-corrosion treatment layer 14a, so that the surface of the second anti-corrosion treatment layer 14b is correspondingly irregular. Moreover, the second adhesive layer 15 is formed along the irregular surface of the second anti-corrosion treatment layer 14b, for which the surface profile of the second adhesive layer 15 on the side of the second anti-corrosion treatment layer 14b is irregular.

In the step of forming such a first particulate anti-corrosion treatment layer 14a, the film-forming conditions are so adjusted that the film thickness becomes smaller within a film thickness range (0.01 to 10 μm) of the first anti-corrosion treatment layer 14a defined above. More particularly, the film-forming conditions are adjusted in such a way that the weight a per unit area of the first anti-corrosion treatment layer 14a takes a relatively smaller value within the above range (of 0.010 to 0.200 g/m$^2$).

In the step of forming the second anti-corrosion treatment layer 14b, the thickness of the second anti-corrosion treatment layer 14b is adjusted (adjustment of a coating amount) in such a way that the surface irregularities of the first anti-corrosion treatment layer 14a are transferred to the second anti-corrosion treatment layer 14b.

According to the structure shown in FIG. 2, the contact area between the second adhesive layer 15 and the second anti-corrosion treatment layer 14b increases and thus, an anchoring effect (anchoring effect) is obtained. Thus, the adhesion force between the second adhesive layer 15 and the second anti-corrosion treatment layer 14b can be more improved thereby enhancing the strength of the packaging material. Further, since the second anti-corrosion treatment layer 14b is formed in a small thickness enough to allow the irregularities of the first anti-corrosion treatment layer 14a to be transferred to the second anti-corrosion treatment layer 14b, the surface area increases thereby enabling the thermal crosslinkage of the second anti-corrosion treatment layer 14b to be promoted. Accordingly, the second anti-corrosion treatment layer 14b is prevented from being swollen by its absorption of a solvent or water, so that the lowering in strength of the packaging material can be suppressed.

In the structure of the anti-corrosion treatment layer 14 shown in FIG. 3, a first anti-corrosion treatment layer 14a formed by coagulation of a plurality of fine particles is formed on the metal foil layer 13. A second anti-corrosion treatment layer 14b having a relatively large thickness is formed (overcoated) to cover the first anti-corrosion treatment layer 14a. Moreover, a second adhesive layer 15 is formed to cover the second anti-corrosion treatment layer 14b.

The first anti-corrosion treatment layer 14a has a coagulation structure wherein a plurality of fine particles are sterically disposed on the metal foil layer 13. A plurality of the coagulation structures are discretely disposed on the metal foil layer 13. The second anti-corrosion treatment layer 14b covers the first anti-corrosion treatment layer 14b so as to fill the gaps between adjacent coagulation structures, and gaps among a plurality of fine particles in the coagulation structure are filled. Additionally, if the metal foil layer has an exposed portion, the second anti-corrosion treatment layer 14b may be in contact with the metal foil layer at the exposed portion.

Furthermore, when compared with the structure shown in FIG. 2, the structure shown in FIG. 3 has the second anti-corrosion treatment layer 14b whose thickness is larger. The second anti-corrosion treatment layer 14b is formed to fully cover the first anti-corrosion treatment layer 14a therewith, and the surface of the second anti-corrosion treatment layer 14b (i.e. the contact surface between the second adhesive layer 15 and the second anti-corrosion treatment layer 14b) becomes flat. In this structure, the thermally crosslinked, second anti-corrosion treatment layer 14b reliably covers the first anti-corrosion treatment layer 14a as a whole, by which an anti-corrosive effect such as of a resistance to electrolytic solution can be improved.

[Second Adhesive Layer]

The second adhesive layer 15 is one that bonds the metal foil layer 13 formed thereon with the anti-corrosion treatment layer 14 and a sealant layer 16.

The second adhesive layer 15 of the present embodiment is a layer containing a compound (which may be sometimes referred to as a reactive compound hereinafter) reactive with a polymer contained in the second anti-corrosion treatment layer 14b. For instance, where the second anti-corrosion treatment layer 14b contains a cationic polymer, the second adhesive layer 15 contains a compound reactive with the cationic polymer. Likewise, where the second anti-corrosion treatment layer 14b contains an anionic polymer, the second adhesive layer 15 contains a compound reactive with the anionic polymer. Moreover, where the second anti-corrosion treatment layer 14b contains a cationic polymer and an anionic polymer, the second adhesive layer 15 contains at least one of a compound reactive with the cationic polymer and a compound reactive with the anionic polymer. In this regard, however, the second adhesive layer 15 does not always contain the two types of compounds indicated above and may contain a compound reactive with both cationic and anionic polymers.

The second adhesive layer 15 may further contain an acid-modified polyolefin resin.

The term "reactive" used herein means to form covalent bond with a cationic polymer or an anionic polymer.

The compound reactive with a cationic polymer includes at least one compound selected from the group consisting of a polyfunctional isocyanate compound, a glycidyl compound, a carboxy group-containing compound, and an oxazoline group-containing compound.

For these polyfunctional isocyanate compound, glycidyl compound, carboxy group-containing compound and oxazoline group-containing compound, mention is made of the isocyanate compounds and oxazoline compounds previously exemplified in the illustration of the first adhesive layer, and the polyfunctional isocyanate compounds, glycidyl compounds, carboxy group-containing compounds and oxazoline group-containing compounds previously exemplified as a crosslinking agent for forming a cationic polymer having a crosslinked structure.

Of these, polyfunctional isocyanate compounds are preferred in view of their high reactivity with a cationic polymer and the ease in forming a crosslinked structure.

As a compound reactive with an anionic polymer, mention is made of at least one compound selected from the group consisting of a glycidyl compound, an oxazoline group-containing compound, and a carbodiimide compound.

These glycidyl compounds, oxazoline group-containing compounds and carbodiimide compounds include the oxazoline compounds and carbodiimide compounds previously exemplified in the illustration of the first adhesive layer, and the glycidyl compounds and oxazoline compounds previously exemplified as a crosslinking agent for forming a cationic polymer having a crosslinked structure.

Of these, glycidyl compounds are preferred in view of high reactivity with an anionic polymer.

Where the second adhesive layer 15 contains an acid-modified polyolefin resin described hereinafter, the reactive compound should preferably have reactivity with an acidic group in the acid-modified polyolefin resin (i.e. to form covalent bond with the acidic group). This permits better adhesion to the anti-corrosion treatment layer 14. Additionally, the acid-modified polyolefin resin is converted into a crosslinked structure, thereby more improving the solvent resistance of the packaging material 10.

The content of the reactive compound is preferably from equal to ten times the amount of the acidic group in the acid-modified polyolefin resin. If equal to or over, the reactive compound well reacts with the acidic group in the acid-modified polyolefin resin. On the other hand, if over ten times the amount, the crosslinked structure with the acid-modified polyolefin resin becomes inadequate, with some concern that physical properties such as such a solvent resistance as mentioned above lowers.

The acid-modified polyolefin resin is a resin obtained by introducing an acidic group into a polyolefin resin. The acidic group includes a carboxy group, a sulfonate group and the like, of which the carboxy group is preferred.

The acid-modified polyolefin resins wherein the carboxy group is introduced into a polyolefin resin includes, for example, those acid-modified polyolefin resins wherein an unsaturated carboxylic acid or its acid anhydride, or an ester of an unsaturated carboxylic acid or its acid anhydride is subjected to graft modification of polyolefin resins in the presence of a radical initiator. The unsaturated carboxylic acid or its acid anhydride, and an ester of an unsaturated carboxylic acid or its acid anhydride may be sometimes both referred to as grafting compound hereinafter.

The polyolefin resin includes low density polyethylene, middle density polyethylene, high density polyethylene, ethylene-a-olefin copolymer, homopolypropylene, block polypropylene, random polypropylene, propylene-a-olefin copolymer or the like.

The unsaturated carboxylic acid includes acrylic acid, methacrylic acid, maleic acid, fumaric acid, itaconic acid, citraconic acid, tetrahydrophthalic acid, bicyclo[2,2,1]hepto-2-ene-5,6-dicarboxylic acid or the like.

The unsaturated carboxylic acid anhydride include maleic anhydride, itaconic anhydride, citraconic anhydride, tetrahydrophthalic anhydride, bicyclo[2,2,1]hepto-2-ene-5,6-dicarboxylic anhydride or the like.

The ester of an unsaturated carboxylic acid or its acid anhydride includes methyl acrylate, methyl methacrylate, ethyl methacrylate, butyl methacrylate, dimethyl maleate, monomethyl maleate, diethyl fumarate, diethyl itaconate, diethyl citraconate, dimethyl tetrahydrophthalic anhydride, dimethyl bicyclo[2,2,1]hepto-2-ene-5,6-dicarboxylate or the like.

The ratio of the grafting compound in the acid-modified polyolefin resin is preferably at 0.2 to 100 parts by mass per 100 parts by mass of the polyolefin resin.

The temperature conditions of the grafting reaction are preferably 50 to 250° C., more preferably 60 to 200° C.

The reaction time depends on the manner of preparation. With the case of melt graft reaction using a twin screw extruder, the reaction time is preferably within a residence time in the extruder. In particular, the time is preferably 2 to 30 minutes, more preferably 5 to 10 minutes.

The grafting reaction is feasible either under conditions of a normal pressure, or under pressure.

The radical initiator includes an organic peroxide. Examples of the organic peroxide include an alkyl peroxide, an aryl peroxide, an acyl peroxide, a ketone peroxide, a peroxyketal, a peroxycarbonate, a peroxyester, a hydroperoxide or the like. These organic peroxides can be appropriately selected depending on the temperature conditions and the reaction time. With the case of the melt grafting reaction using a twin screw extruder, alkyl peroxides, peroxyketals and peroxyesters are preferred, and di-t-butyl peroxide, 2,5-dimethyl-2,5-di-t-butylperoxy-hexyne-3 and dicumyl peroxide are more preferred.

The second adhesive layer 15 may be further formulated with various additives such as a flame retardant, a slipping agent, an anti-blocking agent, an antioxidant, a light stabilizer, a tackifier and the like.

It will be noted that an adhesive ordinarily employed for adhesion between a metal foil layer and a sealant layer might sometimes contain a silane coupling agent. This is because the adhesion is facilitated by formulating the silane coupling agent to enhance adhesion strength. However, when an adhesive formulated with a silane coupling agent is used, there may be some concern that although depending on the type of functional group contained in the silane coupling agent, a side reaction occurs between a component other than the silane coupling agent contained in the adhesive layer and the silane coupling agent thereby impeding an originally intended crosslinking reaction. In the case where there is concern that the reaction is impeded, it is preferred that no silane coupling agent is contained in an adhesive used to bond a metal foil layer and a sealant layer.

In the first embodiment of the present invention, a silane coupling agent may be or may not be contained in the second adhesive layer 15. In this regard, however, according to the first embodiment of the present invention, a reactive compound, which is contained in the second adhesive layer 15, forms covalent bond with a polymer in the second anti-corrosion treatment layer 14b thereby improving adhesion strength between the anti-corrosion treatment layer 14 and the second adhesive layer 15. Accordingly, satisfactory adhesive strength can be obtained even if no coupling agent is formulated in the second adhesive layer 15 for the purpose of promoting the adhesion. In this sense, in the case where there is concern that the crosslinking reaction is impeded, no coupling agent should be preferably contained in the second adhesive layer 15.

The thickness of the second adhesive layer 15 is preferably 3 to 50 μm, more preferably 10 to 40 μm. If the thickness of the second adhesive layer 15 is not less than the lower limit (3 μm), it is likely to obtain excellent adhesiveness. If the thickness of the second adhesive layer 15 is not large than the upper limit (50 μm), an amount of moisture passed from the side end faces of the packaging material 10 is reduced.

[Sealant Layer]

The sealant layer 16 is a layer imparting sealability to the packaging material 10 by heat sealing.

The constituent material of the sealant layer 16 includes, for example, a polyolefin resin or an acid-modified polyolefin resin. For these polyolefin resin and acid-modified polyolefin resin, mention is made of those resins indicated in the illustration of the second adhesive layer 15.

The sealant layer 16 may be a single layer film or a multilayer film wherein a plurality of layers are stacked. According to the function required, there may be used a multilayer film wherein a resin, such as an ethylene-cyclic olefin copolymer or polymethylpentene, is interposed, for example, from the standpoint of imparting moisture proofing.

The sealant layer 16 may be further formulated with various additives including, for example, a flame retardant, a slipping agent, an anti-blocking agent, an antioxidant, a light stabilizer, a tackifier and the like.

The thickness of the sealant layer 16 is preferably 10 to 100 μm, more preferably 20 to 50 μm.

[Method of Fabricating a Packaging Material for Lithium Cell]

The packaging material 10 shown in FIG. 1 can be fabricated according to a fabrication method having the following steps (1) to (3).

(1) Step of forming an anti-corrosion treatment layer 14 on one surface of a metal foil layer 13.

(2) Step of bonding a substrate layer 11 on the other surface of the metal foil layer 13 (a surface opposite to the side on which the anti-corrosion treatment layer 14 has been formed) through a first adhesive layer 12.

(3) Step of bonding a sealant layer 16 over the side of the metal foil layer, on which the anti-corrosion treatment layer 14 has been formed, through a second adhesive layer 15.

Step (1):

The anti-corrosion treatment layer 14 is obtained by forming a first anti-corrosion treatment layer 14a on one surface of the metal foil layer 13 and subsequently forming a second anti-corrosion treatment layer 14b.

More particularly, a material containing a rare earth metal oxide and 1 to 100 parts by mass of phosphoric acid or a phosphate salt per 100 parts by mass of the rare earth element oxide (which may be sometimes referred to as "coating composition (a)" hereinafter) is coated onto one surface of the metal foil layer 13, followed by drying, curing and baking to form a first anti-corrosion treatment layer 14a. Next, a material containing at least one polymer selected from the group consisting of a cationic polymer and an anionic polymer, and a crosslinking agent for crosslinking the polymer (coating composition (b)) is coated on the first anti-corrosion treatment layer 14a, followed by drying, curing and baking to form a second anti-corrosion layer 14b.

Smaller dry coating amounts after drying by heating of the coating compositions (a) and (b) lead to more likelihood of forming the anti-corrosion treatment layer 14 having the structure shown in FIG. 2. Larger dry coating amounts lead to more likelihood of forming the anti-corrosion treatment layer 14 having the structure shown in FIG. 3.

The coating methods may be known ones using, for example, a gravure coater, a gravure reverse coater, a roll coater, a reverse roll coater, a die coater, a bar coater, a kiss coater, a comma coater and the like.

It should be noted that where an aluminum foil is used as the metal foil layer 13, an untreated aluminum foil may be used as set out hereinbefore, or an aluminum foil, which has been subjected to defatting treatment of a wet or dry type, may be used.

Step (2):

For bonding the substrate layer 11 to the other surface of the metal foil layer 13 (i.e. a surface opposite to the side on which the anti-corrosion treatment layer 14 has been formed) through the first adhesive layer 12, there can be adopted known techniques of dry lamination, solvent lamination, wet lamination and the like. Of these, the dry lamination technique is preferred.

The adhesives for forming the first adhesive layer 12 preferably include polyurethane adhesives illustrated with respect to the first adhesive layer 12.

The dry coating amount of the adhesive is preferably 1 to 10 g/m$^2$, more preferably 3 to 7 g/m$^2$.

After bonding the substrate layer 11 to the other surface of the metal oil layer 13, aging (aging) treatment within a range of room temperature to 100° C. may be carried out for promoting the adhesion.

Step (3):

For bonding the sealant layer 16 to the anti-corrosion treatment layer 14 side of the metal foil layer 13 through the second adhesive layer 15, mention is made of a wet process and a dry process.

With the wet process, a solvent-diluted solution or a dispersion of an adhesive containing a compound reactive with a cationic polymer or an anionic polymer, and an acid-modified polyolefin, if necessary, is initially coated onto the anti-corrosion treatment layer 14. Next, the solvent was evaporated at a given temperature (i.e. a temperature not lower than a melting point of an acid-modified polyolefin resin if the adhesive contains the resin), followed by bonding to the sealant layer 16 such as by dry lamination. Alternatively, after the evaporation of the solvent, heating is effected at a temperature not lower than the melting point of the polymer to melt and soften it, followed by baking. Thereafter, the sealant layer 16 is stacked by thermal treatment such as of a thermal lamination method to obtain a packaging material 10.

The coating methods include a variety of coating methods indicated above in the illustration of the step (1).

With the dry process, an adhesive comprising a compound reactive with a cationic polymer or an anionic polymer and, if necessary, an acid-modified polyolefin resin is initially extruded on the anti-corrosion treatment layer 14 such as by extrusion lamination to form a second adhesive layer 15. Next, a sealant layer 16 formed beforehand by an inflation method or casting method is laminated by sandwich extrusion lamination to obtain a packaging material 10.

It will be noted that it is possible to prepare a multilayer film by co-extruding a constituent adhesive of the second adhesive layer 15 and a constituent resin of the sealant layer, and this multilayer film is laminated on the anti-corrosion treatment layer 14 by thermal lamination.

If necessary, for the purpose of improving the adhesion between the coating composition (b) and an adhesive, thermal treatment may be performed. However, in the first embodiment of the present invention, the formation of such a layer configuration as stated above ensures to obtain a packaging material having excellent adhesiveness by a small amount of heat during extrusion lamination.

The thermal treatment methods include an aging treatment, a wrapped-on-hot roll method, a hot roll compression method and the like. The thermal treatment temperature is preferably 40° C. or over for the aging treatment, and is preferably 150° C. or over for the wrapped-on-hot roll method and the hot roll compression method (provided that if the adhesive contains an acid-modified polyolefin, the temperature is at a level not lower than its melting point).

[Advantageous Effects]

The packaging material of the present embodiment having set forth above is comprised of the substrate layer, first adhesive layer, metal foil layer, two layer-structured anti-corrosion treatment layer, second adhesive layer and sealant layer laminated in this order. The anti-corrosion treatment layer includes a rare earth element oxide, a specified amount of phosphoric acid or a phosphate salt, and at least one polymer selected from the group consisting of a cationic polymer and an anionic polymer wherein the at least one polymer is contained in at least the layer (second anti-corrosion treatment layer) in contact with the second adhesive layer. On the other hand, the second adhesive layer is a layer which contains the compound (reactive compound) reactive with the at least one polymer contained in the layer (second anti-corrosion treatment layer) in contact with the second adhesive layer.

In general, the anti-corrosion treatment layer and the adhesive layer form the hydrogen-bonded adhesion interface therebetween.

However, with the packaging material of the present embodiment, when the second adhesive layer is stacked on the second anti-corrosion treatment layer, the polymer contained in the second anti-corrosion treatment layer and the reactive compound contained in the second adhesive layer react with each other to form covalent bonds. Accordingly, the covalently bonded adhesion interface is formed between the second anti-corrosion treatment layer and the second adhesive layer. The laminate having such a covalently bonded adhesion interface tends to be higher in interlayer adhesion strength than a laminate having the hydrogen-bonded adhesion interface.

As stated above, since an electrolytic solution has good capability of infiltration into the sealant layer. Accordingly, an electrolytic solution and hydrofluoric acid generated by hydrolysis of a lithium salt serving as an electrolyte infiltrate between the anti-corrosion treatment layer and the adhesive layer.

However, with the packaging material of the present embodiment, the covalently bonded adhesion interface is formed between the second anti-corrosion treatment layer and the second adhesive layer, so that if the infiltration of the electrolytic solution or hydrofluoric acid occurs, laminate strength can be suppressed from lowering. Thus, the packaging material of the first embodiment of the present invention is improved or even excellent in electrolytic solution resistance.

Additionally, with the packaging material of the present embodiment, strong adhesion between the second anti-corrosion treatment layer and the second adhesive layer is ensured by the formation of the covalent bonding adhesion interface, with the result that high laminate strength is developed within a short aging time.

The anti-corrosion treatment layer contains a rare earth element oxide and phosphoric acid or a phosphate salt. Phosphoric acid or a phosphate salt not only serves for dispersion stabilization of the rare earth element oxide, but also is able to impart an inhibitor effect on the corrosion of the metal foil layer (especially, an aluminum foil). Moreover, it becomes possible to improve adhesion of phosphoric acid or a phosphate salt to the metal foil layer (especially, an aluminum foil layer), thereby enabling a synergistic effect to be developed in terms of the electrolytic solution resistance.

Furthermore, when the anti-corrosion treatment layer is configured to have a multilayer structure composed of the afore-described first anti-corrosion treatment layer and second anti-corrosion treatment layer, there can be realized a packaging material that is more excellent in hydrofluoric acid resistance and high in functionality. The reason for this are considered as follows:

The cationic polymer and the anionic polymer are very effective materials in view of trapping hydrofluoric acid. The addition of a crosslinking agent can lead to an improvement in water resistance. Accordingly, since the anti-corrosion treatment layer is provided with the anti-corrosion treatment layer 14b containing a cationic polymer or anionic polymer as shown in FIG. 1, the resistances to electrolytic solution, hydrofluoric acid and water are more improved.

However, the layer containing the cationic or anionic polymer has no function of protecting a metal foil from being corroded. Therefore, the anti-corrosion treatment layer 14 is arranged to have a multilayer structure that includes, along with the second anti-corrosion treatment layer 14b, the first anti-corrosion treatment layer 14a containing a rare earth element oxide and phosphoric acid or a phosphate salt, so that there is ensured an anti-corrosion effect on a metal foil such as an aluminum foil.

For the fabrication of a lithium cell, there is generally known, for example, a method wherein a packaging material is shaped by cold forming in the form of a pocket, and a cell body and an electrolytic solution are placed in the pocket, followed by hermetic sealing. If the adhesion strength between the anti-corrosion treatment layer and the second adhesive layer is not enough, fine lifting may occur in some cases because of the stress concentrated at the interface between the anti-corrosion treatment layer and the second adhesive layer during the cold forming. The occurrence of the fine lifting permits an electrolytic solution to be infiltrated thereby resulting in the likelihood of lowering insulating properties.

However, when using the packaging material of the present embodiment, the covalently bonded adhesion interface between the second anti-corrosion treatment layer and the second adhesive layer is established, so that fine lifting is less likely to occur at the interface between the anti-corrosion treatment layer and the second adhesive layer during the cold forming and thus, good adhesion interface can be formed to ensure insulating properties.

[Modified Example of the First Embodiment]

The packaging material according to the first embodiment of the present invention is not limited to such an embodiment as set out above. Although the anti-corrosion treatment layer 14 shown in FIG. 1 has a two-layer structure including the first anti-corrosion treatment layer 14a and the second anti-corrosion treatment layer 14b, the anti-corrosion treatment layer 14 may be constituted of three or more layers. As an anti-corrosion treatment layer having a three-layer structure, mention is made, for example, of an anti-corrosion treatment layer including a layer containing an rare earth element oxide and phosphoric acid or a phosphate salt, a layer containing an anionic polymer, and a layer containing a cationic polymer stacked successively in this order; or an anti-corrosion treatment layer including an rare earth element oxide and phosphoric acid or a phosphate salt, a layer containing a cationic polymer, and a layer containing an anionic polymer stacked successively. In this case, the layer including a rare earth element oxide and phosphoric acid or a phosphate salt is disposed on the side of a metal foil layer. Where the cationic polymer-containing layer is in contact with the second adhesive layer, the second adhesive layer should contain a compound reactive with the cationic polymer. Likewise, where the layer containing an anionic polymer is in contact with the second adhesive layer, the second adhesive layer should contain a compound reactive with the anionic polymer.

The anti-corrosion treatment layer 14 may be in the form of a single-layer structure.

Further, although the packaging material 10 shown in FIG. 1 is provided with the anti-corrosion treatment layer 14 only on the one surface of the metal foil layer 13 (i.e. a surface at the side of the second adhesive layer 15), an anti-corrosion treatment layer may be provided on the other surface of the metal oil layer 13 (i.e. a surface at the side of the first adhesive layer 12).

[Second Embodiment]

Figure 4:
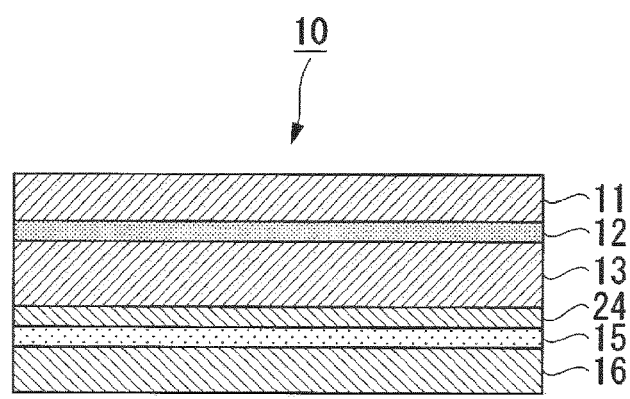
FIG. 4 is a sectional view showing a packaging material for lithium cell according to a second embodiment of the present invention.

A packaging material 10 for lithium cell (hereinafter referred to as simply "packaging material") shown in FIG. 4 is illustrated as a lithium cell packaging material related to a second embodiment of the present invention. It will be noted that in the drawings illustrated hereinbelow, the scales of the respective members are appropriately changed so that the members are recognizable in size.

The packaging material 10 of the present embodiment is constituted of a laminate including, as shown in FIG. 4, a substrate layer 11, a first adhesive layer 12, a metal foil layer 13, an anti-corrosion treatment layer 24, a second adhesive layer 15, and a sealant layer 16 laminated in this order.

The packaging material 10 makes use of the substrate layer 11 as an outermost layer and the sealant layer 16 as an innermost layer.

[Substrate Layer]

The configuration and function of the substrate layer 11 of this embodiment are the same as those of the substrate layer 11 of the first embodiment set out before. Thus, illustration thereof is omitted herein.

[First Adhesive Layer]

The configuration and function of the first adhesive layer 12 of the present embodiment are the same as those of the first adhesive layer 12 of the first embodiment set out before. Thus, further illustration is omitted herein.

[Metal Foil Layer]

The configuration and function of the metal foil layer 13 of the present embodiment are the same as those of the substrate layer 13 of the first embodiment set out before and thus, illustration thereof is omitted herein.

[Anti-corrosion Treatment Layer]

The anti-corrosion treatment layer 24 is a layer, which is provided to prevent the metal foil layer 13 from being corroded with an electrolytic solution or hydrofluoric acid.

The anti-corrosion treatment layer 24 is such that at least a layer thereof in contact with the second adhesive layer contains at least one polymer selected from the group consisting of a cationic polymer and an anionic polymer. The anti-corrosion treatment layer 24 is formed after the metal foil layer 13 has been subjected to at least one treatment selected from the group consisting of defatting treatment, hot water conversion treatment, anodization treatment and chemical conversion treatment.

It will be noted that like the afore-stated first embodiment, where a coating layer such as an anti-corrosion treatment layer 24 is formed on the metal foil layer 13, a technique may be used in some cases wherein a silane coupling agent is generally used to improve adhesion at the interface between the metal foil layer 13 and the anti-corrosion treatment layer 24. In the second embodiment of the present invention, the anti-corrosion treatment layer 24 may or may not contain a silane coupling agent. In this regard, however, although depending on the type of functional group contained in the silane coupling agent used, a side reaction between the component contained in the anti-corrosion treatment layer described hereafter and the silane coupling agent takes place, with some concern that the originally intended reaction may be impeded. If there is concern that the reaction is impeded, it is preferred that no silane coupling agent is contained in the anti-corrosion treatment layer 24.

The defatting treatment, hot water conversion treatment, anodization treatment and chemical conversion treatment are generically called "anti-corrosion treatment" hereinafter.

The defatting treatment includes acid defatting and alkali defatting. For the acid defatting, mention is made of a method using an inorganic acid such as sulfuric acid, nitric acid, hydrochloric acid, hydrofluoric acid or the like, singly or in the form of an acid obtained by mixing thereof as set forth before. When using an acid defatting agent that is obtained by dissolving a fluorine-containing compound such as ammonium monosodium difluoride in such an acid as indicated above, not only a defatting effect of the metal foil layer 13, but also the formation of a metal fluoride in a passive state is enabled, which is effective in terms of a resistance to hydrofluoric acid. The alkali defatting includes a method making use of sodium hydroxide or the like.

The hot water conversion treatment includes a boehmite treatment obtained by immersing a metal foil in boiling water, to which triethanolamine is added.

The anodization treatment includes, for example, an alumite treatment.

The chemical conversion treatment includes those treatments of immersion and coating types.

The immersion type of chemical conversion treatment includes, for example, various chemical conversion treatments such as chromate treatment, zirconium treatment, titanium treatment, vanadium treatment, molybdenum treatment, calcium phosphate treatment, strontium hydroxide treatment, cerium treatment, ruthenium treatment and a mixed phase thereof. The coating type of treatment is a method wherein the chemical conversion treatment agent used in these chemical conversion treatments is further formulated with a resin component thereby forming a coating. In view of the fact that the most excellent corrosion resistance is imparted, the chromate treatment is preferred among the chemical conversion treatments.

The chromate treatment includes, for example, a chromic acid-chromate treatment using a chrome compound such as chromium nitrate, chromium sulfate, chromium acetate, chromium oxalate, chromium biphosphate, chromium acetylacetate, chromium chloride, potassium chromium sulfate or the like; or a phosphoric acid-chromate treatment using a phosphorus compound such as sodium phosphate, potassium phosphate, ammonium phosphate, polyphosphoric acid or the like. An example of the coating type of chromate treatment includes a chromate treatment using any of aminated phenol polymers having units represented by the following general formulas (4) to (7).

[Chem. 4]

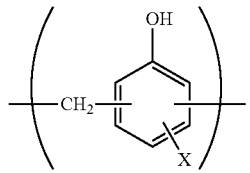

(4)

[Chem. 5]

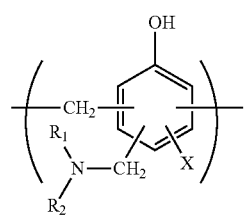

(5)

[Chem. 6]

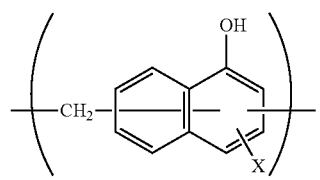

(6)

[Chem. 7]

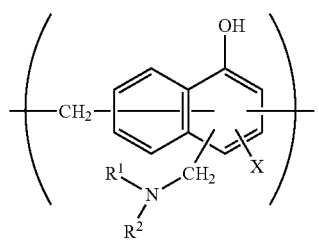

(7)

In the general formulas (4) to (7), each X represents a hydrogen atom, a hydroxy group, an alkyl group, a hydroxyalkyl group, an allyl group or a benzyl group, $R^1$ and $R^2$ may be the same or different and represent a hydroxy group, an alkyl group or a hydroxyalkyl group.

Examples of the alkyl group include linear or branched alkyl groups having 1 to 4 carbon atoms such as a methyl group, an ethyl group, an n-propyl group, an i-propyl group, an n-butyl group, an i-butyl group and a t-butyl group and the like.

Examples of the hydroxyalkyl group include linear or branched alkyl groups substituted with one hydroxy group and having 1 to 4 carbon atoms, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, a 4-hydroxybutyl group and the like.

In the general formulas (4) to (7), the alkyl groups and the hydroxyl alkyl groups represented by X, $R^1$ and $R^2$ may be the same or different, respectively.

In the general formulas (4) to (7), X is preferably a hydrogen atom, a hydroxyl group or a hydroxyalkyl group.

The number average molecular weight of the aminated phenol polymer having the units represented by the general formulas (4) to (7) are not critical and is preferably at 500 to 1,000,000, more preferably at 1,000 to 20,000.

In the case where the above chromic acid-chromate treatment is carried, the content of a chrome compound, calculated as chromium, is preferably at 0.5 to 50.0 mg, more preferably at 1.0 to 40.0 mg, per unit m² of the surface area of the metal foil layer 13. With the case of phosphoric acid-chromate treatment, the content of a phosphorus compound, calculated at phosphorus, is preferably at 0.5 to 50.0 mg, more preferably at 1.0 to 40.0 mg, per unit m² of the surface area of the metal foil layer 13. With the chromate treatment using an aminated phenol polymer, the content of the aminated phenol polymer is preferably at 1.0 to 200.0 mg, more preferably at 5.0 to 15.0 mg, per unit m² of the surface area of the metal foil layer 13.

It should be noted that the coating agent used for the coating type of chemical conversion treatment may contain, as a resin component, at least one polymer selected from the group consisting of a cationic polymer and an anionic polymer.

The cationic polymer is a compound that is excellent in resistances to electrolytic solution and hydrofluoric acid. The reason for this is assumed that the damage of an aluminum foil can be suppressed by trapping fluorine ions with the cationic group (anion catcher).

The cationic polymer includes amine-containing polymers, and specific mention is made of polyethyleneimine, an ionic polymer complex made of polyethyleneimine and a polymer having a carboxylic acid group, a primary amine-grafted acrylic resin wherein a primary amine is graft polymerized to an acrylic main skeleton, a polyallylamine or its derivatives, an aminophenol polymer and the like. These cationic polymers may be used singly or in combination of two or more. Of these, a polyallylamine or its derivatives are preferred.

As a polymer having a carboxylic acid group capable of forming an ionic polymer complex with polyethyleneimine, mention is made of a polycarboxylic acid (or a salt) such as polyacrylic acid or its ionic salt, or its copolymer introduced with a comonomers, and a polysaccharide having a carboxyl group such as carboxymethyl cellulose or its ionic salt.

Usable polyallylamines include homopolymers or copolymers of allylamine, allylamine amide sulfate, diallylamine, dimethylallylamine or the like. These amines may be either free amines or amines stabilized with acetic acid or hydrochloric acid. Usable comonomer components include maleic acid, sulfur dioxide and the like. Additionally, a polyallylamine of the type whose primary amine is partially methoxylated thereby imparting thermal crosslinkability may also be used. It should be noted that in the case of an aminophenol, it is also possible to use an aminophenol of the type, to which thermal crosslinkability is imparted by partial methoxylation of a primary amine.

The cationic polymer should preferably form a crosslinked structure in the anti-corrosion treatment layer 24. When the cationic polymer is in the form of a crosslinked structure, the water resistance of the packaging material 10 is improved.

In order that a cationic polymer has a crosslinked structure, a crosslinking agent should be used along with the cationic polymer when the anti-corrosion treatment layer 24 is formed. As a crosslinking agent for forming a cationic polymer having a crosslinked structure, mention is made, for example, of at least one compound selected from the group consisting of a polyfunctional isocyanate compound, a glycidyl compound, a carboxy group-containing compound, an oxazoline group-containing compound, and a carbodiimide group-containing compound.

The polyfunctional isocyanate compound includes, for example: the diisocyanates exemplified before in the illustration of the first adhesive layer 12; adducts obtained by reacting these diisocyanates with polyhydric alcohols such as trimethylolpropane and the like, biurets obtained by reacting the diisocyanates with water and polyisocyanates such as isocyanurate trimers; and blocked polyisocyanates obtained by blocking the polyisocyanates with alcohols, lactams, oximes and the like.

The glycidyl compounds include, for example: epoxy compounds obtained by reacting glycols, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, neopentyl glycol and the like, with epichlorohydrin; epoxy compounds obtained by reacting polyhydric alcohols, such as glycerine, polyglycerine, trimethylolpropane, pentaerythritol, sorbitol and the like, with epichlorohydrin; and epoxy compounds obtained by reacting dicarboxylic acids, such as phthalic acid, terephthalic acid, oxalic acid, adipic acid and the like, with epichlorohydrin.

The carboxy group-containing compounds include, for example various types of aliphatic or aromatic dicarboxylic acids. Moreover, poly(meth)acrylic acid or alkali (earth) metal salts of poly(meth)acrylic acid may also be used.

Usable oxazoline group-containing compounds include low molecular weight compounds having two or more oxazoline units. Where polymerizable monomers, such as isopropenyloxazoline, are used, those polymers obtained by copolymerization with acrylic monomers such as, for example, (meth)acrylic acid, (meth)acrylic acid alkyl esters and the like can be used.

The carbodiimide group-containing compounds include the carbodiimide compounds previously exemplified in the illustration of the first adhesive layer.

These crosslinking agents is appropriately formulated at 1 to 50 parts by mass per 100 parts by mass of the cationic polymer. If the amount of the crosslinking agent is less than the lower limit (1 part by mass), the crosslinked structure becomes inadequate. On the other hand, when the amount is larger than the upper limit (50 parts by mass), there is some concern that the pot life of a coating solution lowers.

It will be noted that in the case where the cationic polymer is a polyallylamine derivative obtained by methoxicabonylating the primary amine of polyallylamine, the derivative has thermal crosslinkability and is considered substantially equal to a crosslinking agent being formulated in the cationic polymer if no crosslinking agent is formulated in the cationic polymer.

The crosslinking agents may be used singly or in combination of two or more.

Furthermore, a silane coupling agent, which is capable of a siloxane bond acting as a crosslinking point by selective reaction between an amine and a functional group, may or may not be used in combination with a crosslinking agent. In this regard, however, as stated before, in the case where a side reaction occurs between the component contained in the anti-corrosion treatment layer and a silane coupling agent with concern that an originally intended reaction may be impeded, the anti-corrosion treatment layer 24 should preferably be free of a silane coupling agent.

Examples of the silane coupling agent include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, g-mercaptopropyltrimethoxysilane, γ-aminopropyltriethoxysilane, N-β (aminoethyl)- γ-aminopropyltrimethoxysilane, and γ-isocyanatopropyltrimethoxysilane. Especially, β-(3,4epoxycyclohexyl)ethyltrimethoxysilane, γ-aminopropyltriethoxysilane, and γ-isocyanatopropyltrimethoxysilane are preferred when taking reactivity with a cationic polymer or its copolymer into account.

The anionic polymer is a compound for improving the stability of the anti-corrosion treatment layer 24.

Generally, if ionic contaminants, particularly, an alkali metal ion such as a sodium ion or an alkaline earth metal ion, are contained not only in the application field of a packaging material, but also in the protective layer provided for the purpose of inhibiting the corrosion of an aluminum foil with a corrosive compound, the protective layer may be attacked beginning from the ionic contaminants in some cases.

If an anionic polymer is present in the anti-corrosion treatment layer 24, the ionic contaminants can be fixed thereby enabling the durability of the packaging material to be improved.

The anionic polymer is a material having characteristics opposite to those of the cationic polymer. Specifically, carboxy group-containing polymers are mentioned and include poly(meth)acrylic acid or its salt, and a copolymer obtained by copolymerizing a monomer mixture containing (meth)acrylic acid or its salt.

The components other than (meth)acrylic acid or its salt as contained in the monomer mixture include: alkyl (meth) acrylate monomers having an alkyl group such as a methyl group, an ethyl group, an n-propyl group, an i-propyl group, an n-butyl group, an i-butyl group, a t-butyl group, a 2-ethylhexyl group or a cycloalkyl group; amide group-containing monomers including (meth)acrylamide, and N-alkyl(meth)acrylamides and N,N-dialkyl(meth)acrylamides (wherein the alkyl group is a methyl group, an ethyl group, an n-propyl group, an i-propyl group, an n-butyl group, an i-butyl group, a t-butyl group, a 2-ethylhexyl group or a cycloalkyl group), N-alkoxy(meth)acrylamides and N,N-dialkoxy(meth)acrylamides (wherein the alkoxy group is a methoxy group, an ethoxy group, a butoxy group, an isobutoxy group or the like), and N-methylol(meth) acrylamide, N-phenyl(meth)acrylamide and the like; hydroxyl group-containing monomers such as 2-hydroxyethyl (meth)acrylate, 2-hydroxypropyl (meth)acrylate and the like; glycidyl group-containing monomers such as glycidyl (meth)acrylate, allyl glycidyl ether and the like; silane-containing monomers such as (meth)acryloxypropyltrimethoxysilane, (meth)acryloxypropyltrimethoxysilane and the like; and isocyanate group-containing monomers such as (meth)acryloxypropyl isocyanate and the like.

Preferably, the anionic polymer should form a crosslinked structure in the anti-corrosion treatment layer 24 as well. When the anionic polymer forms a crosslinked structure, the water resistance of the packaging material 10 is improved.

In order to provide a crosslinked structure of an anionic polymer, a crosslinking agent should be used along with an anionic polymer when forming the anti-corrosion treatment layer 24. The crosslinking agent used to form an anionic polymer having a crosslinked structure includes ones previously exemplified in the illustration of the cationic polymer. Aside from these crosslinking agents, titanium and zirconium compounds may be used as a crosslinking agent, with which there may be used a method of forming a crosslinked structure such as ionic crosslinkage.

The crosslinking agent is appropriately formulated at 1 to 50 parts by mass per 100 parts by mass of an anionic polymer. If the amount of the crosslinking agent is less than the lower limit (1 part by mass), the crosslinked structure becomes inadequate. On the other hand, when the amount is larger than the upper limit (50 parts by mass), there is some concern that the pot life of the resulting coating solution lowers.

The crosslinking agents may be used singly or in combination of two or more. The crosslinking agent and a silane coupling agent may or may not be used in combination.

In this regard, however, as stated before, in the case where a side reaction occurs between the component contained in the anti-corrosion treatment layer and a silane coupling agent with concern that an originally intended reaction may be impeded, the anti-corrosion treatment layer 24 should preferably be free of a silane coupling agent. Where a crosslinking agent and a silane coupling agent are used in combination, those silane coupling agents exemplified before in the illustration of the cationic polymer can be used in this case.

The anti-corrosion treatment may be carried out only by one type of anti-corrosion treatment or by two more types of anti-corrosion treatments in combination. If the anti-corrosion treatment is effected by chemical conversion treatment, the chemical conversion treatment may be carried out by use of one type of compound alone or by use of two or more types of compounds used in combination.

When at least a part of the anti-corrosion treatment layer is formed according to any one of the anti-corrosion treatments including hot water conversion treatment, anodization treatment and chemical conversion treatment, the aforeindicated defatting treatment should preferably be carried out beforehand. It will be noted that in the case where an aluminum foil having been subjected to defatting treatment is used as the metal foil layer 13, the defatting treatment needs not be carried out again for the formation of the anti-corrosion treatment layer 24.

For the configuration of the anti-corrosion treatment layer 24, mention may be made of the following treatment layers (a) to (j).
  (a) Plural layers wherein a layer formed of a cationic polymer is stacked on the layer formed by anti-corrosion treatment.
  (b) Plural layers wherein a layer formed of an anionic polymer is formed on the layer formed by anti-corrosion treatment.
  (c) Plural layers wherein a layer formed of a cationic polymer and an anionic polymer is formed on the layer formed by anti-corrosion treatment.
  (d) Plural layers wherein a layer formed of a cationic polymer and a layer formed of an anionic polymer are successively stacked on the layer formed by anti-corrosion treatment.
  (e) Plural layers wherein a layer formed of an anionic polymer and a layer formed of a cationic polymer are successively stacked on the layer formed by anti-corrosion treatment.
  (f) Layer formed by anti-corrosion treatment and containing a cationic polymer.
  (g) Layer formed by anti-corrosion treatment and containing an anionic polymer.
  (h) Layer formed by anti-corrosion treatment and containing a cationic polymer and an anionic polymer.
  (i) Plural layers wherein a layer formed of an anionic polymer is stacked on the layer of (f) above.
  (j) Plural layers wherein a layer formed of a cationic polymer is stacked on the layer of (g) above.

In the treatment layers (a) to (c), the layer formed by the anti-corrosion treatment is a layer in contact with the metal foil layer 13, and the layer formed of the cationic polymer and/or anionic polymer (at least one of the cationic and anionic polymers) is a layer in contact with the second adhesive layer 15.

In the treatment layer (d), the layer formed by the anti-corrosion treatment is a layer in contact with the metal foil layer 13, and the layer formed of the anionic polymer is a layer in contact with the second adhesive layer 15.

In the treatment layer (e), the layer formed by the anti-corrosion treatment is a layer in contact with the metal foil layer 13, and the layer formed of the cationic polymer is a layer in contact with the second adhesive layer 15.

In the treatment layers (f) to (h), the layer formed by the anti-corrosion treatment and formed of the cationic polymer and/or anionic polymer is a layer in contact with both the metal foil layer 13 and the second adhesive layer 15.

In the treatment layer (i), the layer of (f) is a layer in contact with the metal foil layer, and the layer formed of the anionic polymer is a layer contacting with the second adhesive layer 15.

In the treatment layer (j), the layer of (g) is a layer contacting with the metal foil layer 13, and the layer formed of the cationic polymer is a layer contacting with the second adhesive layer 15.

The treatment layers (a) to (c) are formed, for example, in the following way, respectively.

Initially, the surface of the metal foil layer 13 (a surface opposite to the side of the first adhesive layer 12, which may be sometimes referred to as "surface to be treated") is subjected to at least one treatment selected from defatting treatment, hot water conversion treatment, anodization treatment and chemical conversion treatment to obtain a layer formed by the anti-corrosion treatment. In this regard, however, where the surface to be treated of the metal foil layer 13 is treated by a coating type of chemical conversion treatment, a coating agent that is free of a cationic polymer and an anionic polymer should be used.

Next, a material containing at least one polymer selected from the group consisting of a cationic polymer and an anionic polymer and, if required, a crosslinking agent for forming a crosslinked structure of the polymer is coated onto the layer formed by the anti-corrosion treatment, followed by drying, curing and baking to obtain a layer formed of the cationic polymer and/or anionic polymer (at least one of cationic and anionic polymers).

Known methods are used for the coating and include those using, for example, a gravure coater, a gravure reverse coater, a roll coater, a reverse roll coater, a die coater, a bar coater, a kiss coater, a comma coater and the like.

The treatment layer (d) is formed, for example, in the following way:

Initially, the surface to be treated of the metal foil layer 13 is treated in the same manner as with the treatment layers (a) to (c) to obtain a layer formed by the anti-corrosion treatment.

Next, a material containing a cationic polymer and, if required, a crosslinking agent for forming the cationic polymer having a crosslinked structure is coated onto the layer formed by the anti-corrosion treatment, followed by drying, curing and baking to obtain a layer formed of the cationic polymer.

Next, a material containing an anionic polymer and, if required, a crosslinking agent for forming an anionic polymer having a crosslinked structure is coated onto the layer formed of the cationic polymer, followed by drying, curing and baking to obtain a layer formed of the anionic polymer.

The treatment layer (e) can be formed in such a way that in the step of forming the treatment layer (d), the order of forming the layer made of the cationic polymer and forming the layer made of the anionic polymer is changed.

The treatment layers (f) to (h) are formed, for example, in the following way:

A coating agent, which contains trivalent chromium, at least one polymer selected from the group consisting of a cationic polymer and an anionic polymer, and, if required, a crosslinking agent for forming a crosslinked structure of the polymer, is coated onto the surface to be treated of the metal foil layer 13, followed by drying, curing and baking to obtain a layer formed by the anti-corrosion treatment and containing the cationic polymer and/or anionic polymer (at least one of the cationic polymer and the anionic polymer).

The treatment layer (i) is formed, for example, in the following way.

A material containing an anionic polymer and, if required, a crosslinking agent for forming an anionic polymer having a crosslinked structure is coated on the layer of (f) above, followed by drying, curing and baking to obtain a layer formed of the anionic polymer.

The treatment layer (j) is formed, for example, in the following way.

A material containing a cationic polymer and, if required, a crosslinking agent for forming an anionic polymer having a crosslinked structure is coated on the layer of (g) above, followed by drying, curing and baking to obtain a layer formed of the cationic polymer.

It will be noted that since the defatting treatment, hot water conversion treatment, anodization treatment and an immersion type chemical conversion treatment selected among the anti-corrosion treatments, particularly, hot water conversion treatment, anodization treatment and immersion-type chemical conversion treatment, enable the surface to be treated of the metal foil layer 13 to be dissolved with a treating agent to form a compound excellent in corrosion resistance (e.g. an aluminum compound such as boehmite or alumite if the metal foil layer 13 used is an aluminum foil layer), the layers including from the metal foil layer 13 to the layer formed by the anti-corrosion treatment are in the form of a bicontinuous structure.

The mass per unit area of the anti-corrosion treatment layer 24 is preferably at 0.005 to 2.000 g/m$^2$, more preferably at 0.010 to 0.100 g/m$^2$. If the mass is not less than the lower limit (0.005 g/m$^2$), it is likely to obtain an effect of inhibiting the metal foil layer 13 from being eroded with an electrolytic solution. If the mass exceeds the upper limit (2.000 g/m$^2$), the effect of inhibiting the metal foil layer 13 from being eroded with an electrolytic solution becomes substantially unchanged.

It is to be noted that although the mass per unit area is noted above, the thickness of the anti-corrosion treatment layer 24 can be calculated from a specific gravity if known.

[Second Adhesive Layer]

The second adhesive layer 15 is one, which bonds the metal foil layer 13 formed thereon with the anti-corrosion treatment layer 24 and the sealant layer 16 together.

The second adhesive layer 15 is a layer that contains a compound (which may be sometimes referred to as "reactive compound" hereinafter) reactive with the polymer contained in the layer contacting with the second adhesive layer of the anti-corrosion treatment layer 24. For instance, in the case where the anti-corrosion treatment layer 24 is any of the above-described treatment layers (a), (e), (f) and (j), the second adhesive layer 15 contains a compound reactive with the cationic polymer. In the case where the anti-corrosion treatment layer 24 is any of the above-described treatment layers (b), (d), (g) and (i), the second adhesive layer 15 contains a compound reactive with the anionic polymer. Where the anti-corrosion treatment layer 24 is the treatment layer (c) or (h), the second adhesive layer 15 contains at least one of a compound reactive with the cationic polymer and a compound reactive with the anionic polymer. In this regard, however, the second adhesive layer 15 should not always contain the two types of compounds indicated above and may contain a compound reactive with both a cationic polymer and an anionic polymer.

The second adhesive layer 15 may further contain an acid-modified polyolefin resin.

The term "reactive with" used herein means to form a covalent bond with a cationic polymer or anionic polymer.

The compounds reactive with a cationic polymer includes those compounds indicated in the first embodiment.

The compounds reactive with an anionic polymer are likewise those indicated in the first embodiment.

Where the second adhesive layer 15 contains an acid-modified polyolefin resin described hereinafter, the reactive compound should preferably be reactive with an acid group in the acid-modified polyolefin resin (i.e. thereby to form a covalent bond with an acidic group). This ensures better adhesion to the anti-corrosion treatment layer 24. Additionally, the acid-modified polyolefin resin becomes crosslinked thereby more improving the solvent resistance of the packaging material 10.

The content of the reactive compound is preferably from an equal amount to 10 times the amount of the acidic group in the acid-modified olefin resin. If not less than an equal amount, the reactive compound well reacts with an acidic group in the acid-modified polyolefin resin. On the other hand, when the content exceeds the ten times limit, the crosslinked structure with the acid-modified polyolefin resin becomes inadequate, with concern that physical properties, such as the above-indicated solvent resistance, lower.

The acid-modified polyolefin resin is a resin obtained by introducing an acidic group into a polyolefin resin. The acidic group includes a carboxy group, a sulfone group or the like, of which the carboxy group is preferred.

The acid-modified polyolefin resins wherein a carboxy group is introduced into polyolefin resins include, for example, acid-modified polyolefin resins obtained by graft modification of polyolefin resins with unsaturated carboxylic acids or acid anhydride thereof, or esters of unsaturated carboxylic acids or acid anhydrides thereof in the presence of a radical initiator. The unsaturated carboxylic acid or its acid anhydride, or an ester of an unsaturated carboxylic acid or its acid anhydride may be sometimes referred wholly to as grafting compound.

As a polyolefin resin, mention is made of low density polyethylene, medium density polyethylene, high density polyethylene, ethylene-a-olefin copolymers, homopolypropylene, block polypropylene, random polypropylene, propylene-a-olefin copolymers and the like.

Unsaturated carboxylic acids include acrylic acid, methacrylic acid, maleic acid, fumaric acid, itaconic acid, citraconic acid, tetrahydrophthalic acid, bicyclo[2,2,1]hepto-2-ene-5,6-dicarboxylic acid and the like.

The anhydrides of unsaturated carboxylic acids include maleic anhydride, itaconic anhydride, citraconic anhydride, tetrahydrophthalic anhydride, bicyclo[2,2,1]hepto-2-ene-5,6-dicarboxylic acid and the like.

The esters of unsaturated carboxylic acids or anhydrides thereof include methyl acrylate, methyl methacrylate, ethyl methacrylate, butyl methacrylate, dimethyl maleate, monomethyl maleate, diethyl fumarate, dimethyl itaconate, diethyl citraconate, dimethyl tetrahydrophthalic anhydride, dimethyl bicyclo[2,2,1]hepto-2-ene-5,6-dicarboxylate and the like.

The ratio of the grafting compound in the acid-modified polyolefin resin is preferably from 0.2 to 100 parts by mass per 100 parts by mass of the polyolefin resin.

The temperature conditions of the grafting reaction preferably include 50 to 250° C., more preferably 60 to 200° C.

The reaction time is influenced by the manner of preparation. With the melt grafting reaction using a twin screw extruder, the reaction time is preferably within a residence time of the extruder. More particularly, the time is preferably 2 to 30 minutes, more preferably 5 to 10 minutes.

The grafting reaction is feasible either under a normal pressure or under pressure.

The radical initiator includes organic peroxides. Examples of the organic peroxide include alkyl peroxides, aryl peroxides, acyl peroxides, ketone peroxides, peroxy ketals, peroxy carbonates, peroxy esters, hydroperoxides and the like. These organic peroxides may be conveniently selected depending on the temperature conditions and reaction time. With the case of the melt grafting reaction using a twin screw extruder as set out before, alkyl peroxides, peroxy ketals and peroxy esters are preferred, and di-t-butyl peroxide, 2,5-dimethyl-2,5-di-(t-butyl peroxy)-hexine-3, and dicumyl peroxide are more preferred.

The second adhesive layer 15 may be further formulated with a variety of additives including a flame retardant, a slipping agent, an anti-blocking agent, an antioxidant, a light stabilizer, a tackifier and the like.

It will be noted that a silane coupling may be contained, in some cases, in ordinary adhesives employed for bonding a metal foil layer and a sealant layer together. This is because the formulation of a silane coupling agent promotes the bonding thereby enhancing bonding strength. However, the use of such an adhesive formulated with a silane coupling agent may cause a component other than the silane coupling agent and contained in the adhesive layer to undergo side reaction with the silane coupling agent although depending on the type of functional group present in the silane coupling agent, with concern that an originally intended crosslinking reaction may be impeded. Hence, in the case where there is some concern that the reaction is impeded, it is preferred that the adhesive for bonding a metal foil layer and a sealant layer together does not contain a silane coupling agent.

In the second embodiment of the present invention, the second adhesive layer 15 may or may not contain a silane coupling agent. In this regard, however, according to the second embodiment of the present invention, the second adhesive layer 15 contains a reactive compound, which forms a covalent bond with the polymer contained in the layer contacting with the second adhesive layer of the anti-corrosion treatment layer 24, thereby leading to improved adhesion strength between the anti-corrosion treatment layer 24 and the second adhesive layer 15. Accordingly, even if a silane coupling agent is not formulated in the second adhesive layer 15 for the purpose of promoting the adhesion, adequate adhesion strength is obtained. In this sense, if there is concern that the crosslinking reaction may be impeded, it is preferred that a silane coupling agent is not contained in the second adhesive layer 15.

The thickness of the second adhesive layer 15 is preferably 3 to 5 µm, more preferably 10 to 40 µm. If the thickness of the second adhesive layer 15 is not less than the lower limit (3 µm), excellent adhesiveness is likely to be obtained. If the thickness of the second adhesive layer 15 is not larger than the upper limit (50 µm), an amount of moisture passing from side end faces of the packaging material 10 is reduced.

[Sealant Layer]

The configuration and function of a sealant layer 16 of the present embodiment are the same as those of the sealant layer 16 of the foregoing first embodiment, and the illustration thereof is omitted.

[Method of Fabricating a Packaging Material for Lithium Cell]

A packaging material 10 shown in FIG. 4 can be fabricated according to a fabrication method having the following steps (1) to (3).

(1) Step of forming the anti-corrosion treatment layer 24 on one surface of the metal foil layer 13.
(2) Step of attaching the substrate layer 11 to the other surface of the metal foil layer 13 (i.e. a surface opposite to the side where the anti-corrosion treatment layer 24 has been formed) through the first adhesive layer 12.
(3) Step of attaching the sealant layer 16 to the side of the metal foil layer 13, on which the anti-corrosion treatment layer 24 has been formed, through the second adhesive layer 15.

(Step 1)

The anti-corrosion treatment layer 24 can be formed on one surface of the metal foil layer 13 by such an anti-corrosion treatment as described before. A specific formation method includes those previously set out in the illustration of the methods of forming the treatment layers (a) to (j).

It will be noted that where an aluminum foil is used as the metal foil layer 13, an untreated aluminum foil may be used as stated before, or an aluminum foil, which has been subjected to defatting treatment of a wet type or a dry type, may also be used.

(Step 2)

For attachment of the substrate layer 11 to the other surface of the metal foil layer 13 (i.e. a surface opposite to the side on which the anti-corrosion treatment layer 24 is to be formed) through the first adhesive layer 12, there can be adopted known techniques of dry lamination, non-solvent lamination, wet lamination and the like. Of these, the use of the dry lamination technique is preferred.

The adhesive used to form the first adhesive layer 12 is preferably a polyurethane adhesive illustrated with respect to the foregoing first adhesive layer 12.

The dry coating amount of the adhesive layer is preferably 1 to 10 g/m², more preferably 3 to 7 g/m².

After the attachment of the substrate layer 11 on the other surface of the metal foil layer 13, aging (aging) treatment may be carried out within a range of room temperature to 100° C. for promoting the adhesion.

Step (3):

For the attachment of the sealant layer 16 to the anti-corrosion treatment layer 24 side of the metal foil layer 13 through the second adhesive layer 15, a wet or dry process is used.

With the wet process, a solvent dilution or dispersion of an adhesive, which contains a compound reactive with a cationic or anionic polymer and, if required, an acid-modified polyolefin resin, is initially coated onto the anti-corrosion treatment layer 24. Next, the solvent is evaporated at a given temperature (or at a temperature not lower than a melting point of an acid-modified polyolefin resin if contained), followed by attachment of the sealant layer 16 such as by a dry lamination method. Alternatively, after evaporation of the solvent, heating to a temperature not lower than the melting point of the polymer is effected for melt softening, followed by baking and stacking the sealant layer 16 by a thermal treatment such as a thermal lamination method to obtain a packaging material 10.

The coating method includes various coating methods previously exemplified in the illustration of the formation methods of the treatment layers (a) to (c).

With the dry process, an adhesive containing a compound reactive with a cationic or anionic polymer and, if necessary, an acid-modified polyolefin resin are initially extruded on the anti-corrosion treatment layer 24 such as by extrusion lamination to form the second adhesive layer 15. Next, a sealant layer formed beforehand by an inflation or casting method is stacked by sandwich extrusion lamination to obtain a packaging material 10.

It will be noted that according to an inflation or casting method, a constituent adhesive of the second adhesive layer 15 and a constituent resin of the sealant 16 may be co-extruded to provide a multilayer film, followed by stacking the multilayer film on the anti-corrosion treatment layer 24 by thermal lamination.

If necessary, a thermal treatment may be carried out for the purpose of improving the adhesion between the coating composition (b) and an adhesive. In the second embodiment of the present invention, since such a layer configuration as stated above is formed, a reduced amount of heat during extrusion lamination is sufficient to obtain the packaging material 10 that is excellent in the adhesiveness.

The thermal treating method includes an aging treatment, a wound-on-hot roll method, a method of thermocompression with hot rolls, and the like. The thermal treatment temperature is preferably 40° C. or higher for the aging method, and is preferably 150° C. or higher for the wound-on-hot roll method and thermocompression method (or a melting point or higher of an acid-modified polyolefin resin if present in the adhesive).

[Advantageous Effects]

The packaging material of the present embodiment set forth hereinabove is constituted of a laminate including a substrate layer, a first adhesive layer, a metal foil layer, an anti-corrosion treatment layer, a second adhesive layer and a sealant layer stacked in this order. The anti-corrosion treatment layer contains at least one polymer selected from the group consisting of a cationic polymer and an anionic polymer at least in its layer contacting with the second adhesive layer. The anti-corrosion treatment layer is formed by subjecting a metal foil layer to at least one of defatting treatment, hot water conversion treatment, anodization treatment and a chemical conversion treatment. On the other hand, the second adhesive layer is one, which contains a compound having reactivity (reactive compound) with the polymer contained in the layer contacting with the second adhesive layer.

Usually, the anti-corrosion treatment layer and an adhesive forms a hydrogen-bonded adhesion interface.

According to the packaging material of this embodiment, when the second adhesive layer is stacked on the anti-corrosion treatment layer, the polymer contained in the layer of the anti-corrosion treatment layer contacting with the second adhesive layer and the reactive compound contained in the second adhesive layer react with each other thereby forming a covalent bond. Accordingly, a covalently bonded adhesion interface is formed between the anti-corrosion treatment layer and the second adhesive layer. The laminate having such a covalently bonded adhesion interface tends to be higher in interlayer adhesion strength than a laminate having a hydrogen-bonded adhesion interface.

As stated above, an electrolytic solution has high permeability against the sealant layer, so that the electrolytic solution, hydrofluoric acid generated by hydrolysis of a lithium salt electrolyte and the like infiltrate between the anti-corrosion treatment layer and the adhesive layer.

However, according to the packaging material of the present embodiment, the covalently bonded adhesion interface is formed between the anti-corrosion treatment layer and the second adhesive layer, so that laminate strength can be suppressed from lowering if an electrolytic solution and hydrofluoric acid infiltrate. Thus, the packaging material of the second embodiment of the present invention is excellent in the resistance to electrolytic solution.

Moreover, when using the packaging material of the present embodiment, the anti-corrosion treatment layer and the second adhesive layer bond strongly by the formation of the covalently bonded adhesion interface. High laminate strength develops even within a short aging time.

The anti-corrosion treatment layer is formed by subjecting a metal foil layer to at least one treatment selected from the group consisting of defatting treatment, hot water conversion treatment, anodization treatment and chemical conversion treatment. The layer formed by these anti-corrosion treatments serves to inhibit corrosion of a metal foil with hydrofluoric acid generated by reaction between an electrolytic solution and moisture, In addition, the interaction with the metal foil is improved thereby acting to improve the adhesion with the second adhesive layer.

A generally known method of fabricating a lithium cell is, for example, one wherein a packaging material is shaped in the form of a pocket by cold forming and a cell body, an electrolytic solution and the like are placed in the pocket and hermetically sealed. If the adhesion strength between the anti-corrosion treatment layer and the second adhesive layer is inadequate, a stress is concentrated at the interface between the anti-corrosion treatment layer and the second adhesive layer during the cold forming, with some possibility that fine lifting occurs. The occurrence of the fine lifting causes an electrolytic solution to be infiltrated and, thus, insulating properties becomes liable to lower.

However, according to the packaging material of the present embodiment, since the covalently bonded adhesion interface is formed between the anti-corrosion treatment layer and the second adhesive layer. As a consequence, when cold forming is carried out, fine lifting is unlikely to occur at the interface between the anti-corrosion treatment layer and the second adhesive layer to form a good adhesion interface with guaranteed insulating properties.

[Modification Example of the Second Embodiment]

The packaging material according to the second embodiment of the present invention is not limited to the above-stated embodiment. Although the packaging material shown in FIG. 4 has the anti-corrosion treatment layer 24 only on one surface (the surface of the second adhesive layer 15 side) of the metal foil layer 13, an anti-corrosion treatment layer may be provided on the other surface of the metal foil layer 13 (the surface of the first adhesive layer 12 side).

It will be noted that preferred embodiments of the present invention have been illustrated, which are for illustrative purposes and should not be construed as limitation of the present invention. Addition, omission, replacement and other alterations may be carried out without departing from the scope of the present invention. Accordingly, the present invention should not be construed as limited to the foregoing illustration and is restricted only by appended claims.

EXAMPLES

The present invention is described in detail by way of examples, which should not be construed as limiting the invention thereto.

Examples corresponding to the foregoing first embodiment are illustrated.

The materials used in the following examples and comparative examples are as follows.

<Anti-corrosion Treatment Layer>

A-1: Cerium oxide sol wherein 10 parts by mass of condensed sodium phosphate was formulated in 100 parts by mass of cerium oxide, followed by adjusting a solid concentration to 10 mass % by use of distilled water as a solvent.

B-1: Mixture of 90 parts by mass of polyallylamine and 10 parts by mass of a glycidyl compound wherein a solid concentration was adjusted to 5 mass % by use of distilled water as a solvent.

B-2: Mixture of 90 parts by mass of polyacrylic acid and 10 parts by mass of a compound having an oxazoline group (i.e. a copolymer obtained by copolymerizing isopropenyl oxazoline and acrylic acid) wherein a solid concentration was adjusted to 5 mass % by use of distilled water as a solvent.

<Second Adhesive Layer>

C-1: Adhesion composition wherein 10 parts by mass (solid ratio) of a polyisocyanate compound having an isocyanurate structure was formulated relative to 100 parts by mass of a maleic anhydride-modified polyolefin resin dissolved in toluene. The amount of the polyisocyanate compound was thrice the amount of the acidic group (carboxy group) of the maleic anhydride-modified polyolefin resin.

C-2: Adhesive composition wherein 10 parts by mass (solid ratio) of a glycidyl compound was formulated relative to 100 parts by mass of a maleic anhydride-modified polyolefin resin dissolved in toluene. The amount of the glycidyl compound was five times the amount of the acidic group (carboy group) of the maleic anhydride-modified polyolefin resin.

C-3: Adhesive composition wherein a polyester polyol made of a hydrogenated dimer fatty acid and a diol, and a polyisocyanate were formulated at a molar ratio (NCO/OH) of 2.

Example X1

Initially, A-1 was coated on one surface of a metal foil made of an aluminum foil and dried to form a first anti-corrosion treatment layer, and B-1 was subsequently coated onto the first anti-corrosion treatment layer and dried to form a second anti-corrosion treatment layer. It will be noted that A-1 and B-1 were each coated by microgravure coating. The total dry coated amount of A-1 and B-1 after the drying by heating was made at 70 to 100 mg/m$^2$.

Next, a polyurethane adhesive (A525/A52, manufactured by Mitsui Chemicals & SKC Polyurethanes, Inc.) was coated on the other surface of the metal foil layer (i.e. a surface opposite to the side on which the first and second anti-corrosion treatment layers had been formed) by dry lamination in a dry coated amount of 4 to 5 mg/m$^2$ to form a first adhesive layer. A substrate layer made of a polyamide film was attached to through the first adhesive layer.

Next, C-1 was coated on the second anti-corrosion treatment layer by dry lamination in a dry coated amount of 4 to 5 g/m$^2$ to form a second adhesive layer. A 40 µm thick polypropylene film was stacked, as a sealant layer, through the second adhesive layer, thereby obtaining a laminate having such a layer configuration of substrate layer 11/first adhesive layer 12/metal foil layer 13/first anti-corrosion treatment layer 14$a$/second anti-corrosion treatment layer 14$b$/second adhesive layer 15/sealant layer 16 as shown in FIG. 1.

The thus obtained laminate was aged for 5 days or 10 days to obtain a packaging material.

The section of the respective packaging materials obtained was observed through an electron microscope to confirm the structure of the anti-corrosion treatment layer, revealing such a structure as shown in FIG. 2. More particularly, the first anti-corrosion treatment layer 14$a$ had a discontinuous structure wherein a plurality of fine particles were discretely distributed on the metal foil layer 13. On the other hand, the second anti-corrosion treatment layer 14$b$ covered the first anti-corrosion treatment layer so as to fill the spaces of the first anti-corrosion treatment layer 14$a$ in fine particulate form, and the surface of the second anti-corrosion treatment layer was irregular.

<Evaluation>

(Evaluation of Electrolytic Solution Resistance)

The respective packaging materials obtained above were cut into rectangular pieces having a size of 100×15 mm to provide evaluation samples, followed by evaluation of a resistance to electrolytic solution in a manner set out below. The results are shown in Table 1.

LiPF$_6$ was added to a solution of ethylene carbonate/diethyl carbonate/dimethyl carbonate=1/1/1 (ratios by mass) so that its concentration was adjusted to 1M to prepare an electrolytic solution, followed by charging into a Teflon (registered trade name) container. A sample was placed in the container and kept at 85° C. for 4 hours after hermetic sealing. Thereafter, the sample was taken out from the container and immersed in water for further 2 hours. The peeled-off state of the sample after the immersion was assessed according to the following standards. It will be noted that the case that the electrolytic solution resistance of the packaging material obtained after aging for 5 days was evaluated as "○" or "⊙" was judged as acceptable.

⊙ (excellent): Laminate strength is not less than 10 N/15 mm (under a cross-head speed of 300 mm/minute).

○ (good): Laminate strength is from not less than 5N/15 mm to less than 10N/15 mm (under a cross-head speed of 300 mm/minute).

Δ (wrong): Laminate strength is less than 5N/15 mm (under a cross-head speed of 300 mm/minute).

X (bad): Delamination occurs and laminate strength cannot be measured.

(Evaluation of Insulation Properties)

The respective packaging materials were each shaped in the form of a pocket having a size of 70×80 mm with a depth of 4 mm by use of a cold forming device. 5 g of the electrolytic solution prepared with respect to the electrolytic solution resistance was placed, as a content, in the resulting formed article, which was subsequently covered with a non-formed piece of the packaging material. Next, the formed article and the non-formed piece of the packaging material were superposed in such a way that the respective sealant layers were facing each other, followed by heat sealing to ensure hermetic sealing thereby obtaining a formed sample. The heat sealing was performed such that an aluminum tab lead (Al tab lead) was so set up that its one end was immersed in an electrolytic solution along with a tab film made of an acid-modified polyolefin film and the other end of the aluminum tab was extended to outside of the formed sample, and these were interposed between the formed article and the non-formed piece of the packaging material.

Part of the surface (an outer layer portion) of the formed sample was filed off so that the metal foil layer made of an aluminum foil was purposely exposed, after which electrode terminals were, respectively, attached to the exposed metal foil layer and the Al tab lead, followed by measurement of an dielectric resistance by application of a voltage of 25 V and evaluation based on the following standards.

○ (good): Dielectric resistance is 100 MΩ or over (with the measuring limit being 200 MΩ).

Δ (wrong): Dielectric resistance is from 50 MΩ to less than 100 MΩ.

X (bad): Dielectric resistance is less than 50 MΩ.

Examples X2-X4, Comparative Examples X1-X4

Packaging materials were fabricated in the same manner as in Example X1 except that the materials used to form the second adhesive anti-corrosion treatment layer and the second adhesive layer were changed to those indicated in Table 1, and were evaluated. The results are shown in Table 1.

It will be noted that the sections of the respective packaging materials obtained in Examples X2-X 4 and Comparative Examples X1-X4 were observed with an electron microscope to confirm the structure of the anti-corrosion treatment layer, thereby obtaining similar results as in Example X1.

TABLE 1

| | First anti-corrosion treatment layer | Second anti-corrosion Treatment layer | Second adhesive layer | Aging period (days) | Resistance to electrolytic solution Laminate strength (N/15 mm) | Evaluation | Insulating properties Dielectric resistance value (MΩ) | Evaluation |
|---|---|---|---|---|---|---|---|---|
| Example X1 | A-1 | B-1 | C-1 | 10 | 13.9 | ⊙ | 200 (measuring limit) | ○ |
| | | | | 5 | 12.3 | ⊙ | 200 (measuring limit) | ○ |
| Example X2 | A-1 | B-1 | C-2 | 10 | 12.4 | ⊙ | 200 (measuring limit) | ○ |
| | | | | 5 | 11.1 | ⊙ | 200 (measuring limit) | ○ |
| Example X3 | A-1 | B-1 | C-3 | 10 | 6.9 | ○ | 200 (measuring limit) | ○ |
| | | | | 5 | 5.1 | ○ | 200 (measuring limit) | ○ |
| Example X4 | A-1 | B-2 | C-2 | 10 | 11.4 | ⊙ | 200 (measuring limit) | ○ |
| | | | | 5 | 6.9 | ○ | 200 (measuring limit) | ○ |
| Comparative Example X1 | A-1 | — | C-1 | 10 | Delamination | x | — | — |
| | | | | 5 | Delamination | x | — | — |
| Comparative Example X2 | A-1 | — | C-2 | 10 | Delamination | x | — | — |
| | | | | 5 | Delamination | x | — | — |
| Comparative Example X3 | A-1 | — | C-3 | 10 | Delamination | x | — | — |
| | | | | 5 | Delamination | x | — | — |
| Comparative Example X4 | A-1 | B-2 | C-1 | 10 | 8.9 | ○ | 80 | Δ |
| | | | | 5 | 4.8 | Δ | 80 | Δ |

As will be apparent from Table 1, the packaging materials obtained in Examples X1 to X4 were excellent in the resistances to electrolytic solution and insulating properties.

On the other hand, the packaging materials obtained in Comparative Examples X1 to X3, in which the anti-corrosion treatment layer was free of a cationic or anionic polymer, underwent delamination and were poor in the resistance to electrolytic solution. Since the packaging materials obtained in Comparative Examples X1 to X3 underwent delamination, the insulating property was not evaluated.

With the packaging material obtained in Comparative Example X4 wherein the anti-corrosion treatment layer contained the anionic polymer and the second adhesive layer contained the compound reactive with the cationic polymer, when the aging period was short, satisfactory laminate strength was not obtained and the resistance to electrolytic solution was poor. The packaging material obtained in Comparative Example X4 showed a dielectric resistance value, which permitted its use as a consumer cell, but was inferior in insulation properties to the packaging materials obtained in Examples X1 to X4.

Next, examples corresponding to the second embodiment are illustrated.

The materials used in the following examples and comparative examples are as indicated below.

[Materials Used]

<Anti-corrosion Treatment Layer>

A-1: Layer formed by an immersion type of chromate treatment using a chromium compound (provided that no resin binder was contained) on one surface of a metal foil layer.

B-1: Mixture made of 90 parts by mass of polyallylamine and 10 parts by mass of a glycidyl compound wherein the solid concentration was adjusted to 5 mass % by using distilled water as a solvent.

B-2: Mixture made of 90 parts by mass of polyacrylic acid and 10 parts by mass of an oxazoline group-containing compound (a copolymer obtained by copolymerizing isopropenyl oxazoline) wherein the solid concentration was adjusted to 5 mass % by using distilled water as a solvent.

<Second Adhesive Layer>

C-1: Adhesive composition wherein 10 parts by mass (solid content ratio) of a polyisocyanate compound having an isocyanurate structure was formulated relative to 100 parts by mass of a maleic anhydride-modified polyolefin resin dissolved in toluene. The amount of the polyisocyanate compound was three times the amount of the acidic group (carboxy group) of the maleic anhydride-modified polyolefin resin.

C-2: Adhesive composition wherein 10 parts by mass (solid content ratio) of a glycidyl compound was formulated relative to 100 parts by mass of a maleic anhydride-modified polyolefin resin dissolved in toluene. The amount of the glycidyl compound was five times the amount of the acidic group (carboxy group) of the maleic anhydride-modified polyolefin resin.

C-3: Adhesive composition wherein a polyester polyol made of a hydrogenated dimer fatty acid and a diol, and a polyisocyanate were formulated at a molar ratio (NCO/OH) of 2.

Example Y1

Initially, a chromate treatment was carried out on one surface of a metal foil layer made of an aluminum foil to form A-1, followed by coating B-1 on the A-1 and drying to form an anti-corrosion treatment layer. It will be noted that the coating of B-1 was carried out by microgravure coating. The coated amount of the B-1 was adjusted to 70 to 100 mg/m$^2$.

Next, a polyurethane adhesive (A525/A52, manufactured by Mitsui Chemicals & SKC Polyurethanes Inc.) was coated onto the other surface of the metal foil layer (i.e. a surface opposite to the side on which the anti-corrosion treatment layer had been formed) by dry lamination in a dry coated amount of 4 to 5 g/m$^2$ to form a first adhesive layer. A substrate layer made of a polyamide film was attached through the first adhesive layer.

Next, C-1 was applied onto the anti-corrosion treatment layer by dry lamination in a dry coated amount of 4 to 5 g/m$^2$ to form a second adhesive layer. A 40 µm thick polypropylene film serving as a sealant was stacked through the second adhesive layer to obtain a laminate having a layer configuration of substrate layer 11/first adhesive layer 12/metal foil layer 13/anti-corrosion treatment layer 24/second adhesive layer 15/sealant layer 16 as shown in FIG. 4.

The thus obtained laminate was aged at 40° C. for 5 days or 10 days to obtain a packaging material.

<Evaluation>

(Evaluation of Electrolytic Solution Resistance)

The respective packaging materials obtained above were cut into rectangular pieces having a size of 100×15 mm to provide evaluation samples, followed by evaluation of a resistance to electrolytic solution in a manner set out below. The results are shown in Table 2.

$LiPF_6$ was added to a solution of ethylene carbonate/diethyl carbonate/dimethyl carbonate=1/1/1 (ratios by mass) so that its concentration was adjusted to 1M to prepare an electrolytic solution, followed by charging into a Teflon (registered trade name) container. A sample was placed in the container and kept at 85° C. for 4 hours after hermetic sealing. Thereafter, the sample was taken out from the container and immersed in water for further 2 hours. The peeled-off state of the sample after the immersion was assessed according to the following standards. It will be noted that the case that the electrolytic solution resistance of the packaging material obtained after aging for 5 days was evaluated as "○" or "◎" was judged as acceptable.

◎ (excellent): Laminate strength is not less than 10 N/15 mm (under a cross-head speed of 300 mm/minute).

○ (good): Laminate strength is from not less than 5N/15 mm to less than 10N/15 mm (under a cross-head speed of 300 mm/minute).

Δ (wrong): Laminate strength is less than 5N/15 mm (under a cross-head speed of 300 mm/minute).

X (bad): Delamination occurs and laminate strength cannot be measured.

material were superposed in such a way that the respective sealant layers were facing each other, followed by heat sealing to ensure hermetic sealing thereby obtaining a formed sample. The heat sealing was performed such that an aluminum tab lead (A1 tab lead) was so set up that its one end was immersed in an electrolytic solution along with a tab film made of an acid-modified polyolefin film and the other end of the aluminum tab was extended to outside of the formed sample, and these were interposed between the formed article and the non-formed piece of the packaging material.

Part of the surface (an outer layer portion) of the formed sample was filed off so that the metal foil layer made of an aluminum foil was purposely exposed, after which electrode terminals were, respectively, attached to the exposed metal foil layer and the A1 tab lead, followed by measurement of an dielectric resistance by application of a voltage of 25 V and evaluation based on the following standards.

○ (good): Dielectric resistance is 100 MΩ or over (with the measuring limit being 200 MΩ).

Δ (wrong): Dielectric resistance is from 50 MΩ to less than 100 MΩ.

X (bad): Dielectric resistance is less than 50 MΩ.

Examples Y2-Y4, Comparative Examples Y1-Y4

Packaging materials were fabricated in the same manner as in Example Y1 except that the materials used to form the anti-corrosion treatment layer and the second adhesive layer were changed to those indicated in Table 2, and were evaluated. The results are shown in Table 2.

TABLE 2

| | Anti-corrosion treatment layer | Second adhesive layer | Aging period (days) | Resistance to electrolytic solution | | Insulating properties | |
|---|---|---|---|---|---|---|---|
| | | | | Laminate strength (N/15 mm) | Evaluation | Dielectric resistance value (MΩ) | Evaluation |
| Example Y1 | A-1 | B-1 | C-1 | 10 | 14.1 | ◎ | 200 (measuring limit) | ○ |
| | | | | 5 | 13.2 | ◎ | 200 (measuring limit) | ○ |
| Example Y2 | A-1 | B-1 | C-2 | 10 | 13 | ◎ | 200 (measuring limit) | ○ |
| | | | | 5 | 11.4 | ◎ | 200 (measuring limit) | ○ |
| Example Y3 | A-1 | B-1 | C-3 | 10 | 11 | ◎ | 200 (measuring limit) | ○ |
| | | | | 5 | 7.1 | ○ | 200 (measuring limit) | ○ |
| Example Y4 | A-1 | B-2 | C-2 | 10 | 10.8 | ◎ | 200 (measuring limit) | ○ |
| | | | | 5 | 7.1 | ○ | 200 (measuring limit) | ○ |
| Comparative Example Y1 | A-1 | — | C-1 | 10 | Delamination | x | — | — |
| | | | | 5 | Delamination | x | — | — |
| Comparative Example Y2 | A-1 | — | C-2 | 10 | Delamination | x | — | — |
| | | | | 5 | Delamination | x | — | — |
| Comparative Example Y3 | A-1 | — | C-3 | 10 | Delamination | x | — | — |
| | | | | 5 | Delamination | x | — | — |
| Comparative Example Y-4 | A-1 | B-2 | C-1 | 10 | 9.5 | ○ | 95 | Δ |
| | | | | 5 | 4.2 | Δ | 95 | Δ |

(Evaluation of Insulation Properties)

The respective packaging materials were each shaped in the form of a pocket having a size of 70×80 mm with a depth of 4 mmm by use of a cold forming device. 5 g of the electrolytic solution prepared with respect to the electrolytic solution resistance was placed, as a content, in the resulting formed article, which was subsequently covered with a non-formed piece of the packaging material. Next, the formed article and the non-formed piece of the packaging As will be apparent from Table 2, the packaging materials obtained in Examples Y1 to Y4 were excellent in the electrolytic solution resistance and the insulating properties.

On the other hand, the packaging materials obtained in Comparative Examples Y1 to Y3, in which the anti-corrosion treatment layer was free of a cationic or anionic polymer, underwent delamination and were poor in the resistance to electrolytic solution. Since the packaging materials obtained in Comparative Examples Y1 to Y3 underwent delamination, the evaluation of the insulating properties could not be made.

With the packaging material obtained in Comparative Example Y4 wherein the anti-corrosion treatment layer contained an anionic polymer and the second adhesive layer contained a compound reactive with the cationic polymer, when the aging period was short, satisfactory laminate strength was not obtained and the resistance to electrolytic solution was poor. The packaging material obtained in Comparative Example Y4 showed a dielectric resistance value, which permitted its use as a consumer cell, but was inferior in insulation properties to the packaging materials obtained in Examples Y1 to Y4.

INDUSTRIAL APPLICABILITY

According to the present invention, there can be obtained a packaging material for lithium cell, which allows the development of high laminate strength within a short aging time, is excellent in resistance to electrolytic solution, and ensures insulation properties after cold forming.

REFERENCE SIGNS LIST 10 packaging material for lithium cell
11 substrate layer
12 first adhesive layer
13 metal foil layer
14 anti-corrosion treatment layer
14a first anti-corrosion treatment layer
14b second anti-corrosion treatment layer
15 second adhesive layer
16 sealant layer
24 anti-corrosion treatment layer

What is claimed is:
1. A packaging material for lithium cell comprising:
a laminate of a substrate layer,
a first adhesive layer,
a metal foil layer,
an anti-corrosion treatment layer of a single-layer or plural-layer structure,
a second adhesive layer,
and a sealant layer stacked in this order,
wherein the anti-corrosion treatment layer is provided on a side of the second adhesive layer and contains a rare earth element oxide, 1 to 100 parts by mass of phosphoric acid or a phosphate salt per 100 parts by mass of the rare earth element oxide, an anionic polymer, the anionic polymer being contained in the layer contacting with the second adhesive layer, the second adhesive layer containing a compound reactive with the anionic polymer contained in the layer contacting with the second adhesive layer, wherein the compound is selected from the group consisting of a glycidyl compound, an oxazoline group-containing compound and a carbodiimide compound.
2. The packaging material for lithium cell of claim 1,
wherein the anti-corrosion treatment layer further contains a cationic polymer in the layer contacting with the second adhesive layer, and the second adhesive layer contains a second compound reactive with the cationic polymer, which is at least one member selected from the group consisting of a polyfunctional isocyanate, a glycidyl compound, a carboxy group-containing compound and an oxazoline group-containing compound.

3. The packaging material for lithium cell of claim 2,
wherein the cationic polymer is at least one member selected from the group consisting of polyethyleneimine, an ionic polymer complex made of polyethyleneimine and a polymer having a carboxylic acid, a primary amine-grafted acrylic resin wherein a primary amine is grafted to an acrylic main skeleton, polyallylamine or a derivative thereof, and an aminophenol polymer.
4. The packaging material for lithium cell of claim 1,
wherein the anionic polymer is a polymer having a carboxy group-containing polymer, which is made of poly(meth)acrylic acid or its salt, or a copolymer obtained by copolymerizing a monomer mixture including (meth)acrylic acid or its salt.
5. The packaging material for lithium cell of claim 1,
wherein the second adhesive layer further comprises an acid-modified polyolefin resin.
6. The packaging material for lithium cell of claim 1,
wherein the rare earth element oxide is a cerium oxide.
7. The packaging material for lithium cell of claim 1,
wherein the anti-corrosion treatment layer having a single-layer or plural-layer structure is provided between the first adhesive layer and the metal foil layer.
8. The packaging material for lithium battery of claim 1,
wherein the compound is a glycidyl compound.
9. A packaging material for lithium cell comprising:
a laminate of a substrate layer,
a first adhesive layer,
a metal foil layer,
an anti-corrosion treatment layer of a single-layer or plural-layer structure,
a second adhesive layer;
and a sealant layer stacked in this order,
wherein the anti-corrosion treatment layer is provided on a side of the second adhesive layer and contains an anionic polymer in a layer contacting with the second adhesive layer, and the anti-corrosion treatment layer is formed by subjecting the metal foil layer to at least one treatment selected from the group consisting of defatting treatment, hot water conversion treatment, anodization treatment and chemical conversion treatment, the second adhesive layer containing a compound reactive with the anionic polymer contained in the layer contacting with the second adhesive layer, wherein the compound is selected from the group consisting of a glycidyl compound, an oxazoline group-containing compound and a carbodiimide compound.
10. The packaging material for lithium cell of claim 9,
wherein the anti-corrosion treatment layer further contains a cationic polymer in the layer contacting with the second adhesive layer, and the second adhesive layer contains a second compound reactive with the cationic polymer, which is at least one member selected from the group consisting of a polyfunctional isocyanate, a glycidyl compound, a carboxy group-containing compound and an oxazoline group-containing compound.
11. The packaging material for lithium cell of claim 10,
wherein the cationic polymer is at least one member selected from the group consisting of polyethyleneimine, an ionic polymer complex made of polyethyleneimine and a polymer having a carboxylic acid, a primary amine-grafted acrylic resin wherein a primary amine is grafted to an acrylic main skeleton, polyallylamine or a derivative thereof, and an aminophenol polymer.

12. The packaging material for lithium cell of claim 9, wherein the anionic polymer is a polymer having a carboxy group-containing polymer, which is made of poly(meth)acrylic acid or its salt, or a copolymer obtained by copolymerizing a monomer mixture including (meth)acrylic acid or its salt.

13. The packaging material for lithium cell of claim 9, wherein the second adhesive layer further comprises an acid-modified polyolefin resin.

14. The packaging material for lithium cell of claim 9, wherein the rare earth element oxide is a cerium oxide.

15. The packaging material for lithium cell of claim 9, wherein the anti-corrosion treatment layer having a single-layer or plural-layer structure is provided between the first adhesive layer and the metal foil layer.

16. The packaging material for lithium battery of claim 9, wherein the compound is a glycidyl compound.

\* \* \* \* \*